United States Patent
Trammell et al.

(10) Patent No.: US 12,287,840 B1
(45) Date of Patent: *Apr. 29, 2025

(54) SYSTEMS AND METHODS FOR USING CROWD SOURCING TO EVALUATE TRUTHFULNESS OR BIAS IN ONLINE CONTENT

(71) Applicant: Applied Decision Research LLC, Middletown, DE (US)

(72) Inventors: Travis Trammell, Stanford, CA (US); Richard Kim, Stanford, CA (US)

(73) Assignee: Applied Decision Research LLC, Middletown, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/954,278

(22) Filed: Nov. 20, 2024

Related U.S. Application Data

(63) Continuation of application No. 17/869,138, filed on Jul. 20, 2022, now Pat. No. 12,248,481, which is a continuation of application No. 17/582,500, filed on Jan. 24, 2022, now Pat. No. 11,803,559, which is a continuation of application No. 17/412,150, filed on Aug. 25, 2021, now Pat. No. 11,250,009, which is a continuation of application No. 16/190,100, filed on Nov. 13, 2018, now Pat. No. 11,157,503.

(60) Provisional application No. 62/586,821, filed on Nov. 15, 2017.

(51) Int. Cl.
*G06F 16/958* (2019.01)
*G06F 16/9536* (2019.01)

(52) U.S. Cl.
CPC ........ *G06F 16/958* (2019.01); *G06F 16/9536* (2019.01)

(58) Field of Classification Search
None
See application file for complete search history.

(56) References Cited

U.S. PATENT DOCUMENTS

| | | | |
|---|---|---|---|
| 7,783,644 | B1 | 8/2010 | Petrou |
| 8,019,641 | B2 | 9/2011 | Foroutan |
| 8,086,484 | B1 | 12/2011 | Gibson |
| 8,219,555 | B1 | 7/2012 | Mianji |
| 8,458,065 | B1 | 6/2013 | Zhang |
| 8,554,600 | B2 | 10/2013 | Reisman |
| 8,606,792 | B1 | 12/2013 | Jackson |

(Continued)

*Primary Examiner* — Giuseppi Giuliani
(74) *Attorney, Agent, or Firm* — Sheppard Mullin Richter & Hampton LLP

(57) ABSTRACT

A method comprising identifying a content item having stated facts and/or opinions which a user is unsure whether to trust; during a first time period, obtaining first content evaluations of the content item from first users, each first content evaluation evaluating a belief state of the stated facts and/or opinions; displaying the first content evaluations; during a second time period initiating later than the first time period, obtaining second evaluations from second users regardless of second user expertise, the second users defined as having hindsight and thus knowledge as to the belief state of the stated facts and/or opinions greater than the first users; generating and issuing expert scores for the first users based on the second evaluations; and elevating an influential characteristic of each first user having an expert score higher than a certain threshold when providing another evaluation during another time period.

26 Claims, 21 Drawing Sheets

(56) References Cited

U.S. PATENT DOCUMENTS

| | | | |
|---|---|---|---|
| 8,930,338 B2 | 1/2015 | Velipasaoglu | |
| 8,935,272 B2 | 1/2015 | Ganti | |
| 9,053,195 B2 | 6/2015 | Yang | |
| 9,285,973 B1 | 3/2016 | Gable | |
| 10,115,137 B2 | 10/2018 | Ceribelli | |
| 10,140,421 B1 | 11/2018 | Bernard | |
| 10,178,197 B2 | 1/2019 | Dunn | |
| 10,346,500 B2 | 7/2019 | Childress | |
| 10,402,465 B1 | 9/2019 | Jain | |
| 10,407,078 B2 | 9/2019 | Ratnasingam | |
| 10,423,999 B1 | 9/2019 | Doctor | |
| 10,475,100 B1 | 11/2019 | Herz | |
| 11,232,466 B2 | 1/2022 | Frank | |
| 2003/0069883 A1 | 4/2003 | Etoh | |
| 2003/0123696 A1 | 7/2003 | Matsumoto | |
| 2004/0039917 A1 | 2/2004 | Ross | |
| 2006/0200413 A1 | 9/2006 | Kessel | |
| 2006/0248076 A1* | 11/2006 | Troy | G06F 16/3347 707/999.005 |
| 2007/0050238 A1 | 3/2007 | Carr | |
| 2007/0192130 A1 | 8/2007 | Sandhu | |
| 2008/0288324 A1 | 11/2008 | Graczynski | |
| 2009/0024605 A1* | 1/2009 | Yang | G06F 16/9535 707/999.005 |
| 2009/0037355 A1 | 2/2009 | Brave | |
| 2009/0144272 A1 | 6/2009 | Adarsh | |
| 2010/0042577 A1* | 2/2010 | Rinearson | G06Q 10/10 706/56 |
| 2010/0169148 A1 | 7/2010 | Oberhofer | |
| 2010/0205541 A1 | 8/2010 | Rapaport | |
| 2010/0205550 A1 | 8/2010 | Chen | |
| 2011/0212430 A1 | 9/2011 | Smithmier | |
| 2011/0227699 A1 | 9/2011 | Seth | |
| 2011/0238670 A1 | 9/2011 | Mercuri | |
| 2011/0295722 A1 | 12/2011 | Reisman | |
| 2011/0307495 A1 | 12/2011 | Shoshan | |
| 2012/0123953 A1 | 5/2012 | Jabara | |
| 2012/0130723 A1 | 5/2012 | Bhattacharjee | |
| 2012/0158668 A1 | 6/2012 | Tu | |
| 2012/0197651 A1 | 8/2012 | Robinson | |
| 2012/0291057 A1 | 11/2012 | Gunda | |
| 2013/0013592 A1 | 1/2013 | Narvekar | |
| 2013/0066710 A1 | 3/2013 | Zimak | |
| 2013/0110732 A1 | 5/2013 | Uppal | |
| 2013/0204871 A1 | 8/2013 | Wong | |
| 2014/0058744 A1 | 2/2014 | Nadarajah | |
| 2014/0222444 A1 | 8/2014 | Cerello | |
| 2014/0373137 A1 | 12/2014 | Muttik | |
| 2015/0019566 A1 | 1/2015 | Jones | |
| 2015/0019640 A1 | 1/2015 | Li | |
| 2015/0046446 A1 | 2/2015 | Gannu | |
| 2015/0074033 A1 | 3/2015 | Shah | |
| 2015/0142827 A1 | 5/2015 | Hasan | |
| 2015/0142888 A1 | 5/2015 | Browning | |
| 2015/0205869 A1 | 7/2015 | Green | |
| 2015/0241231 A1 | 8/2015 | Abramson | |
| 2015/0269236 A1 | 9/2015 | Rosen | |
| 2015/0302335 A1 | 10/2015 | Unda | |
| 2015/0363481 A1 | 12/2015 | Haynes | |
| 2016/0055236 A1 | 2/2016 | Frank | |
| 2016/0092959 A1 | 3/2016 | Gross | |
| 2016/0117695 A1* | 4/2016 | Fuller | G06Q 30/0282 705/7.32 |
| 2016/0170996 A1 | 6/2016 | Frank | |
| 2016/0224803 A1 | 8/2016 | Frank | |
| 2016/0269345 A1 | 9/2016 | Weizman | |
| 2016/0300252 A1 | 10/2016 | Frank | |
| 2017/0019496 A1 | 1/2017 | Orbach | |
| 2017/0085607 A1 | 3/2017 | Li | |
| 2017/0178162 A1 | 6/2017 | Duggal | |
| 2017/0235848 A1 | 8/2017 | Van Dusen | |
| 2017/0236086 A1 | 8/2017 | Simon | |
| 2017/0364825 A1* | 12/2017 | Tiell | G06Q 10/0635 |
| 2018/0013772 A1 | 1/2018 | Schmidtler | |
| 2018/0025368 A1 | 1/2018 | Frank | |
| 2018/0039631 A1 | 2/2018 | Gupta | |
| 2018/0047071 A1* | 2/2018 | Hsu | G06Q 30/0282 |
| 2018/0122172 A1 | 5/2018 | Soni | |
| 2018/0129673 A1 | 5/2018 | Pandey | |
| 2018/0285461 A1 | 10/2018 | Smith | |
| 2019/0005419 A1 | 1/2019 | Howard | |
| 2019/0147062 A1* | 5/2019 | Kim | H04N 21/4532 707/748 |

\* cited by examiner

SYSTEMS AND METHODS FOR USING CROWD SOURCING TO EVALUATE TRUTHFULNESS OR BIAS IN ONLINE CONTENT

PRIORITY CLAIM

This application is a continuation of U.S. patent application Ser. No. 17/869,138, filed on Jul. 20, 2022, entitled "Systems and Methods For Using Crowd Sourcing To Score Online Content As It Relates To A Belief State," which is a continuation of U.S. patent application Ser. No. 17/582,500, filed Jan. 24, 2022, entitled "Systems and Methods For Using Crowd Sourcing To Score Online Content As It Relates To A Belief State," issued as U.S. Pat. No. 11,803,559, which is a continuation of U.S. patent application Ser. No. 17/412,150, filed Aug. 25, 2021, entitled "Systems and Methods For Using Crowd Sourcing To Score Online Content As It Relates To A Belief State," issued as U.S. Pat. No. 11,250,009, which is a continuation of U.S. patent application Ser. No. 16/190,100, filed Nov. 13, 2018, entitled "Systems and Methods For Using Crowd Sourcing To Score Online Content As It Relates To A Belief State," issued as U.S. Pat. No. 11,157,503, which claims the benefit of U.S. Provisional Patent Application No. 62/586,821, filed Nov. 15, 2017, entitled "Systems and Methods for Evaluating the Veracity of News and/or Other Content," which are hereby incorporated by reference herein.

TECHNICAL FIELD

This present disclosure relates to online content. More specifically, the present disclosure relates to systems and method for using crowd sourcing to score online content as it relates to a belief state such as truthfulness or political bias.

BACKGROUND

The news is broken and getting worse. First, the rise of the Internet and now social media has opened Pandora's box for an almost infinite number of content producers that has made it impossible for the average consumer to adequately evaluate the veracity of information they are consuming. Fact checkers cannot keep up, and the financial incentive to keep consumers viewing and clicking only portends for the situation to get worse. Simply put, the speed of information verification cannot keep up with pace of modern information distribution and consumption. Even worse, nefarious actors have taken advantage of this situation to produce "fake news" for a variety of motivations. Fake news is defined as partially or completely inaccurate content that is designed to emulate factual news without the knowledge of the consumer.

The Internet has enabled the distribution of vast amounts of information to an incredibly large population virtually instantaneously and for comparatively low cost. While the development of this capability has resulted in enormous economic development and provided the great benefit of information exchange to the world, it has also exposed the same population to increased risk, not the least of which emanates from fake news. The rapid distribution of fake news can cause contagion, can manipulate markets, can spark conflict, and can fracture strategic relations. Most catastrophically, fake news has the potential to undermine self-government and fracture democratic institutions around the world.

The current fact checking enterprise consists of independent reviewing agencies, which are only able to select a small portion of the overall content produced. The primary method for fact checking involves a group of researchers associated with a particular agency (e.g., Snopes.com, FactCheck.org, etc.) reviewing an article and conducting research to verify the underlying assertions. Inherently, this process takes substantial time and, therefore, a fact check review is typically released after the majority of consumers have already interacted with the content. Thus, only a very small portion of content actually receives external fact checking prior to consumption. Even more problematic is that popularity often drives the content fact checkers target. Thus, by definition, a large group of consumers must have already viewed the content before the fact check even begins. Additionally, the number of fact checkers associated with each agency is limited and potentially biases the selection process for the agency.

Systems and methods are needed to avoid the potential calamity resulting from the "end of truth."

SUMMARY

A claimed solution rooted in computer technology overcomes problems specifically arising in the realm of computer technology.

Various embodiments herein address the crisis by combining crowd-sourcing techniques and Bayesian probabilities to generate belief states of information evaluators. Various embodiments herein may utilize a news aggregator as a platform where individuals consume content items (e.g., news articles, news reports, blog articles, etc.) and can provide evaluations (or ratings) of their beliefs (e.g., on a discrete scale from low to high), e.g., of the veracity or political bias of the content items which they are consuming (e.g., reading, hearing and/or watching). The collective set of ratings may be used to generate a group belief state of each of the content items.

Various embodiments herein are built around the necessity of achieving near instantaneous "fact checking", made possible by a large crowd of users who rate their beliefs of the content items. In various embodiments, the process can begin immediately with the release of a content item, such as the publication of a news article by a publisher on a website. By minimizing the time delay for the content item to be evaluated and providing the consumer with more information sooner, users can better evaluate the belief state, e.g., the veracity or political bias, of the content item being consumed or can better filter the content item before it is consumed.

By leveraging the wisdom of the crowd, various embodiments effectively manage fake news and retain the sanctity of the "news" label.

In some embodiments, the present invention provides a system comprising at least one hardware processor; memory storing computer instructions, the computer instructions when executed by the at least one hardware processor configured to cause the system to during a first time period that expires upon satisfaction of a first trigger condition, obtain one or more first content ratings of a particular content item from one or more first users, each first content rating defining a first user measure of a belief state of the particular content item; and generate a first content score for the particular content item, the first content score defining a crowd-sourced measure of the belief state of the particular content item; during a second time period that expires upon satisfaction of a second trigger condition, obtain one or more second content ratings from one or more second users for the particular content item, each second content rating defining a second user measure of the belief state of the particular content item; and generate a second content score for the particular content item, the second content score defining a second crowd-sourced measure of the belief state of the particular content item; compare the second content score of the belief state of the particular content item against each of the one or more first content ratings of the particular content item to determine an expert score for each of the one or more first users; and issue the expert score to each of the one or more first users.

The belief state may be truthfulness or political bias. The first content score for the particular content item may be generated using Bayesian probabilities. The first trigger condition or the second trigger condition may include expiration of a predetermined time period. The first trigger condition or the second trigger condition may include receiving a predetermined number of content ratings. The computer instructions may be further configured to cause the system to, during an initial time period, obtain one or more initial content ratings of a particular content item from one or more initial users, each initial content rating defining an initial user measure of the belief state of the particular content item; and generate an initial content score for the particular content item, the initial content score defining an initial crowd-sourced measure of the belief state of the particular content item. Each content rating may include a discrete value between a low value and a high value. Each content rating may further include a confidence value associated with the discrete value. The computer instructions may further be configured to cause the system to generate the first content score based on the expert score associated with each first user.

In some embodiments, the present invention provides a method comprising during a first time period, obtaining one or more first content ratings of a particular content item from one or more first users, each first content rating defining a first user measure of a belief state of the particular content item; and generating a first content score for the particular content item, the first content score defining a crowd-sourced measure of the belief state of the particular content item; during a second time period, obtaining one or more second content ratings from one or more second users for the particular content item, each second content rating defining a second user measure of the belief state of the particular content item; and generating a second content score for the particular content item, the second content score defining a second crowd-sourced measure of the belief state of the particular content item; comparing the second crowd-sourced measure of the belief state of the particular content item against each of the one or more first content ratings of the particular content item to determine an expertise value for each of the one or more first users; and issuing the expertise value to each of the one or more first users.

The belief state for the method may be truthfulness or political bias. The first content score for the particular content item may be generated using Bayesian probabilities. The first trigger condition or the second trigger condition may include expiration of a predetermined time period. The first trigger condition or the second trigger condition may include receiving a predetermined number of content ratings. The method may further comprise, during an initial time period, obtaining one or more initial content ratings of a particular content item from one or more initial users, each initial content rating defining an initial user measure of the belief state of the particular content item; and generating an initial content score for the particular content item, the initial content score defining an initial crowd-sourced measure of the belief state of the particular content item. Each content rating may include a discrete value between a low value and a high value. Each content rating may further include a confidence value associated with the discrete value. The method may further comprise generating the first content score based on the expert score associated with each first user.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

DETAILED DESCRIPTION

Various embodiments herein address the crisis by combining crowd-sourcing techniques and Bayesian probabilities to generate belief states of information evaluators. Various embodiments herein may utilize a news aggregator as a platform where individuals consume content items (e.g., news articles, news reports, blog articles, etc.) and can provide evaluations (or ratings) of their beliefs (e.g., on a discrete scale from low to high), e.g., of the veracity or political bias of the content items which they are consuming (e.g., reading, hearing and/or watching). The collective set of ratings may be used to generate a group belief state of each of the content items.

Various embodiments herein are built around the necessity of achieving near instantaneous "fact checking", made possible by a large crowd of users who rate their beliefs of the content items. In various embodiments, the process can begin immediately with the release of a content item, such as the publication of a news article by a publisher on a website. By minimizing the time delay for the content item to be evaluated and providing the consumer with more information sooner, users can better evaluate the belief state, e.g., the veracity or political bias, of the content item being consumed or can better filter the content item before it is consumed.

By leveraging the wisdom of the crowd, various embodiments effectively manage fake news and retain the sanctity of the "news" label.

Figure 1:
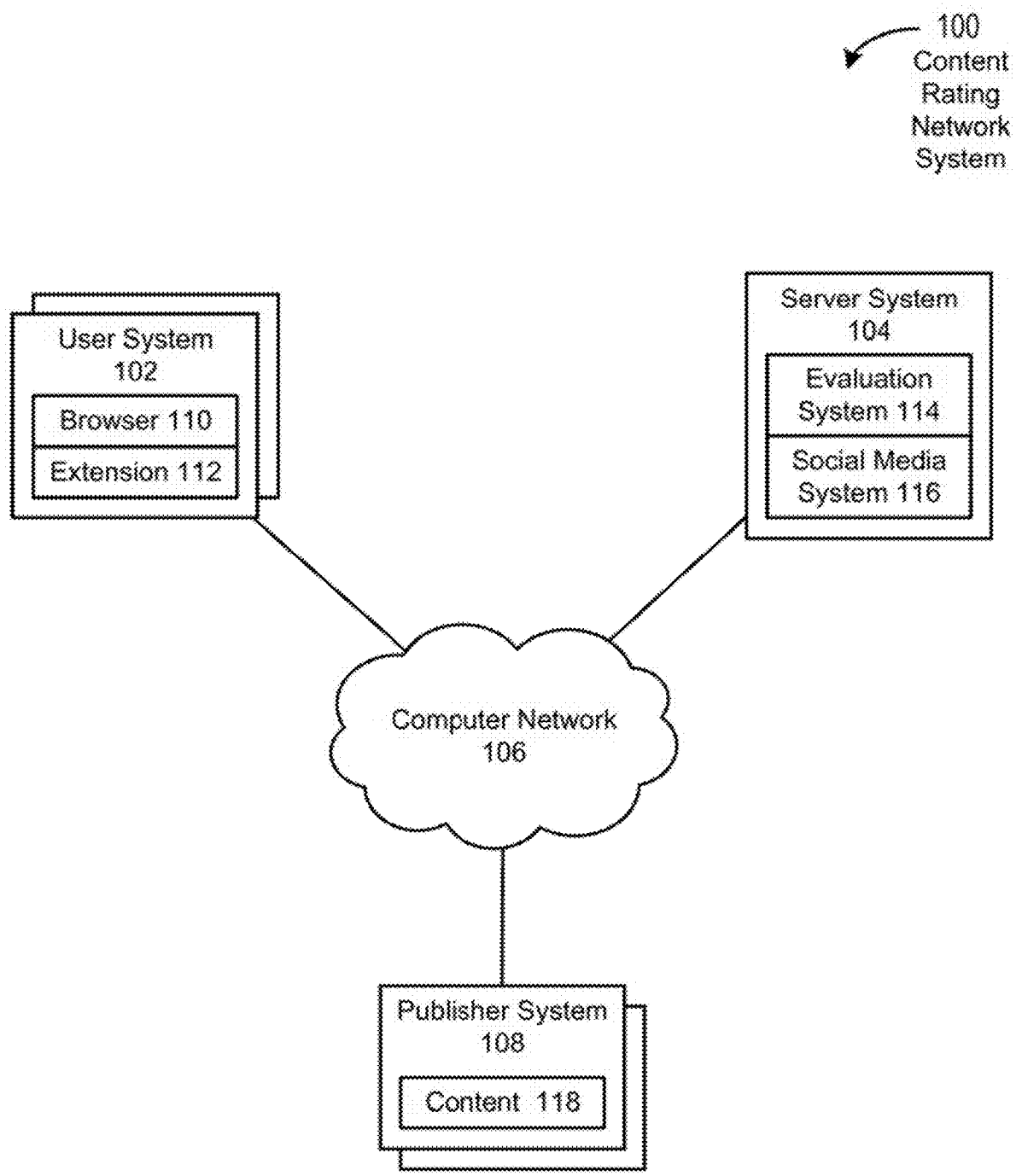
FIG. 1 depicts a block diagram of an example content rating network system, according to some embodiments.

FIG. 1 depicts a block diagram of an example content rating network system 100, according to some embodiments. The content rating network system 100 includes a plurality of user systems 102, each with a browser 110 and an extension 112. The content rating network system 100 further includes at least one server system 104 with a content evaluation system 114 and a social media system 116. The content rating network system 100 further includes a plurality of publisher systems 108, each with one or more published content items 118. The plurality of user systems 102, the server system 104 and the plurality of publisher systems 108 are coupled together by a computer network 106.

Each user system 102 includes a processor-based system, such as a desktop, laptop, smart pad, smart phone, etc., configured to execute the browser 110 and the extension 112. The browser 110, such as Microsoft Internet Explorer™ or Apple Safari™, includes hardware, software and/or firmware configured to navigate websites and present content items to users.

The extension 112 includes additional hardware, software and/or firmware, such as a plugin, configured to cooperate with the browser 110 to obtain and present content scores from the server system 104, to obtain content ratings from users, to monitor user behavior with the content items, and to communicate the content items and/or the user behavior to the server system 104. Additional details about the extension 112 are discussed herein.

The server system 104 includes a processor-based system, such as a desktop or laptop configured to execute the evaluation system 114 and the social media system 116. The evaluation system 114 includes hardware, software and/or firmware configured to receive content ratings and/or user behavior information associated with content items, to generate content scores for the content items, to report content scores to the users consuming the content items, to evaluate the content ratings to identify experts and generate expert scores, and to provide a reward-based system to motivate users to rate content and become experts. The social media system 116 includes hardware, software and/or firmware configured to present content items to users, either in user-specific content pages after applying filter choices set by the users or in a generic home page after applying general filter choices set by managers of the social media system 116. Additional details about the evaluation system 114 and the social media system 116 are discussed herein.

Each publisher system 108 includes a processor-based system, such as a desktop, laptop, smart pad, smart phone, etc., configured to present the online content items 118. Each publisher system 108 may include a system for a news aggregator, professional media, blogger, social media site, Twitter, Facebook, LinkedIn, YouTube, etc. Additional details of the publisher system 108 are discussed herein.

The communication network 106 may represent one or more computer networks or other transmission mediums. The communication network 106 may provide communication between user systems 102, server systems 104 and publisher systems 108 and/or other systems described herein. In some embodiments, the communication network 106 includes one or more computing devices, routers, cables, buses, and/or other network topologies (e.g., mesh, and the like). The communication network 106 may be wired and/or wireless. The communication network 106 may include the Internet, one or more wide area networks (WANs) or local area networks (LANs), public networks, private networks, IP-based networks, non-IP-based networks, and so forth.

Figure 2:
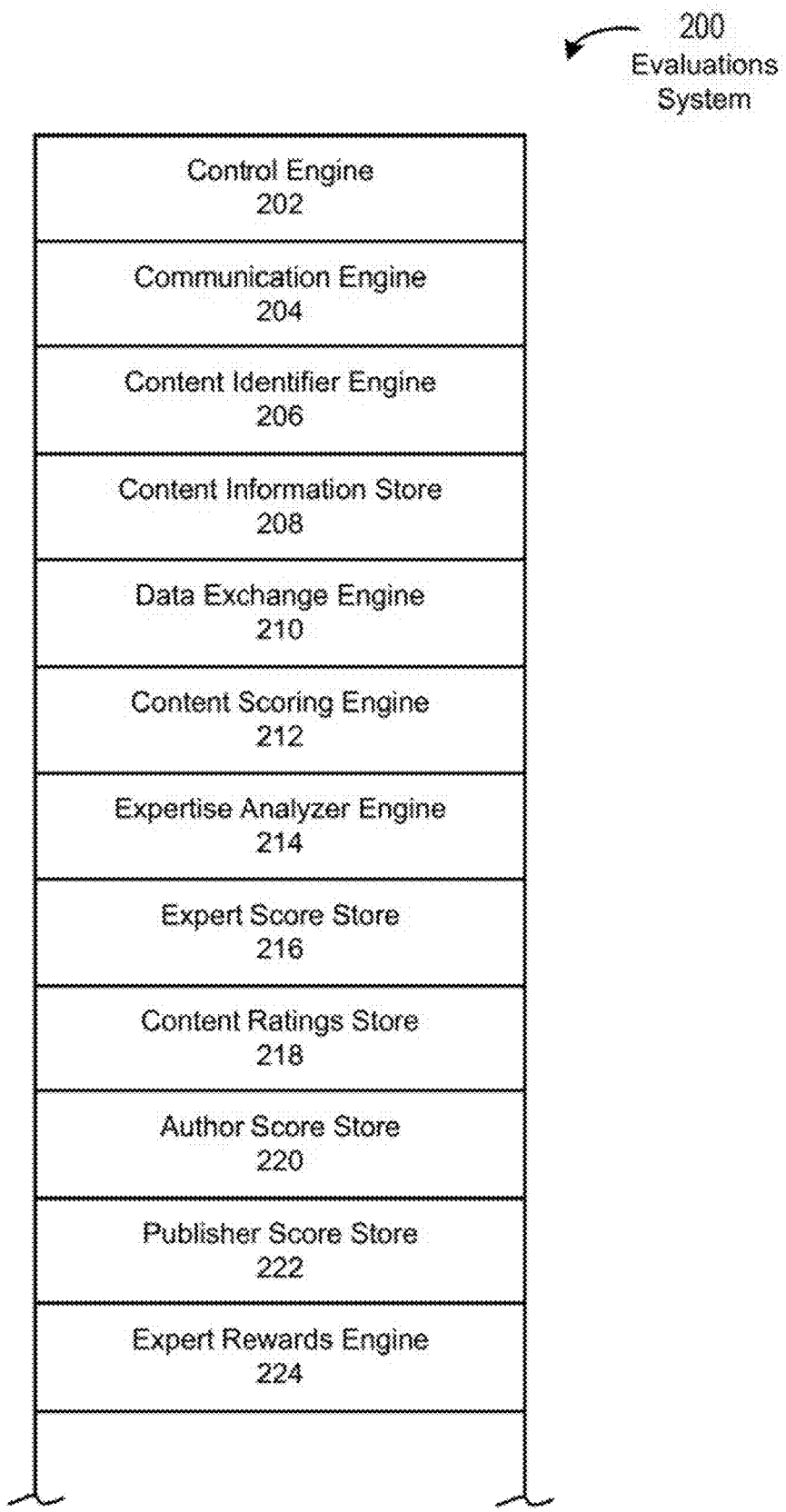
FIG. 2 depicts a block diagram of an example evaluation system, according to some embodiments.

FIG. 2 depicts a block diagram of an example evaluation system 114, according to some embodiments. The evaluation system 114 includes a control engine 202, a communications engine 204, a content identifier engine 206, a content information store 208, a data exchange engine 210, a content scoring engine 212, an expertise analyzer engine 214, an expert score store 216, a content ratings store 216, an author score store 220, a publisher score store 222, and an expert reward engine 224.

The control engine 202 includes hardware, software and/or firmware configured to manage the other components of the evaluation system 114. In some embodiments, the control engine 202 monitors trigger conditions to determine when initial evaluators are providing content ratings that will be used to generate an initial content score that is allowed to be presented to users, when primary evaluators are providing content ratings to update the initial content score to generate a dynamically updating primary content score that is allowed to be presented to users, and when secondary evaluators are providing content ratings to generate a secondary content score that will be used to identify experts within the primary evaluators.

The communication engine 204 includes hardware, software and/or firmware configured to communicate with the computer network 106. The communication engine 204 may function to send requests, transmit and, receive communications, and/or otherwise provide communication with one or a plurality of systems. In some embodiments, the communication engine 204 functions to encrypt and decrypt communications. The communication engine 204 may function to send requests to and receive data from one or more systems through a network or a portion of a network.

Depending upon implementation-specified considerations, the communication engine 204 may send requests and receive data through a connection, all or a portion of which may be wireless.

The content identifier engine 206 includes hardware, software and/or firmware configured to identify content items. In some embodiments, the content identifier engine 206 begins to generate a data store of content items being evaluated by receiving the URL and/or a hash of the content item from the extension 112. In some embodiments, any content item may be evaluated. In some embodiments, the content identifier engine 206 obtains a white list of content items from the content information store 208 of content items allowed to be evaluated. Notably, the hash may be used to ensure that the content item is the same content item, and has not been changed by the publisher or a different publisher of the content item. The URL and/or hash may be stored in the content information store 208. That way, when a user navigates to the content item, the extension 112 can obtain the URL and/or the hash, can provide the identifier to the content identifier engine 206, and can receive content score information back from the evaluation system 114.

The data exchange engine 210 includes hardware, software and/or firmware configured to facilitates information passing with the extension 112. In some embodiments, the data exchange engine 210 is configured to obtain, process and forward content identifiers, content rating information, user comments, and/or user behavior information received from the extension 112. In some embodiments, the data exchange engine 210 is configured to obtain, process and forward content scores, comments and other information to the extension 112 for presentation to the users.

The content scoring engine 212 includes hardware, software and/or firmware configured to obtain content ratings from users for content items as to particular belief states, e.g., truthfulness, political bias, etc. Content ratings may be discrete values from low to high. In some embodiments, the content ratings may be in a 5-point scale, a 10-point scale, a 20-point scale, a 100-point scale, etc. The content ratings may be presented as a spectrum, e.g., from highly conservative to highly liberal, such that the ends of the scale define polar ends of the spectrum. Other mechanisms may be used to represent content ratings. In some embodiments, the user provides a content rating as to a belief state (e.g., truthfulness or political bias) along with his associated confidence level on the content rating.

The content scoring engine 212 uses Bayesian probabilities to generate content scores as to the different belief states based on the content ratings provided. Details of the Bayesian models are described below with reference to FIGS. 15, 16A, 16B, 17, 18A and 18B. Although the system is described as using Bayesian models, other models such as Frequentist probabilities may alternatively be used.

In some embodiments, the content scoring engine 212 may account for the expertise of the user providing the content rating, the amount of time that the user spent consuming the content item, whether the user visited other sites before returning to the content item to provide the content rating, whether the user conducted particular research regarding the content item prior to providing the content rating, etc.

As described in greater detail herein, the content scoring engine 212 may generate an initial score provided during an initial period, e.g., using the first few content ratings from initial users (e.g., 1, 2, 3, 4 or 5). Upon the content scoring engine 212 generating the initial score, the data exchange engine 210 may provide the initial content score to the user system 102 for presentation.

The content scoring engine 212 may continue to use Bayesian probabilities to update the initial score with subsequent content ratings received from primary users during a primary period, e.g., until a primary trigger condition occurs, to generate a dynamically updating primary content score. The primary trigger condition may include expiration of a preliminary time period such as 1 or 2 days, receiving a predetermined number of content ratings (e.g., 100), receiving a signal from an external source, etc. Other alternative primary trigger conditions are possible.

In some embodiments, the content scoring engine 212 may generate a secondary score based on the content ratings received after the primary trigger condition occurs and until a secondary trigger condition occurs during which content ratings are received from secondary users, which are assumed to be those with a retrospective (likely better) understanding of the belief state of the content item. The secondary trigger condition may include the expiration of a secondary time period, receiving a predetermined number of content ratings from any secondary user (e.g., 20 or 50), receiving a predetermined number of content ratings from users having an high expert level (e.g., 20), receiving a signal from an external source, etc. Other alternative secondary trigger conditions are possible.

In some embodiments, the content scoring engine 212 uses the secondary content ratings received during the secondary period to update the dynamically updating primary score which is presented to the users. In some embodiments, the content scoring engine 212 may replace the primary score with the secondary score at the expiration of the secondary period. In some embodiments, the content scoring engine 212 may update the primary score with content ratings received after the secondary trigger condition has occurred. In some embodiments, the content scoring engine 212 may replace the primary score with the secondary score, and may update the secondary score with the content ratings received after the second trigger condition has occurred.

In some embodiments, the primary period and the secondary period may overlap. For example, the primary period may continue as content ratings are being provided during the secondary period. In some embodiments, the primary period may expire when the secondary period expires.

In some embodiments, the content scoring engine 212 may ignore content ratings from users who spent less than a predetermined amount of time consuming the content item, suggesting that they did not give it enough thought or are gaming the system. In some embodiments, the content scoring engine 212 expects a Normal distribution of scores from a user across content items, and therefore may ignore the content ratings of a user whose distribution falls outside the expectation, e.g., who provides the same rating across content items.

In some embodiments, the content scoring engine 212 may aggregate content scores to generate aggregate or entity scores. For example, the content scoring engine 212 may aggregate the content scores of content items from the same author to generate a content score of the author (e.g., the truthfulness of the author). The content scoring engine 212 may aggregate the content scores of several content items published by the same publisher to generate a content score for the publisher (e.g., the truthfulness of the publisher). Other aggregations are possible.

The expertise analyzer engine 214 includes hardware, software and/or firmware configured to generate expert scores of users evaluating content items. In some embodiments, the expertise analyzer engine 214 examines the content ratings of users who provided content ratings during the initial and primary periods against the secondary content score generated during the secondary period. Those users who were provided prompt and accurate content ratings during the primary content period are given higher expertise points. In some embodiments, the expertise analyzer engine 214 gives one point per prompt and accurate content rating over a predetermined number of content ratings, e.g., one point for each prompt and accurate content rating from the prior 20 content ratings. In some embodiments, the expertise analyzer engine 214 provides expertise points based on how close the users were to the secondary score. For example, the expertise analyzer engine 214 may give a user 2 points if within a certain tight percentage of the secondary score and 1 point if the user was within a looser percentage. In some embodiments, the expertise level may be a score within a 5-point scale, a 10-point scale, a 20-point scale, a 100-point scale, etc. In some embodiments, the content ratings of users outside a current time period, e.g., 3 months, 1 year, 4 years, the Presidential term, may be deemed too stale to be considered.

In some embodiments, the expertise analyzer engine 214 generates a generic expert level for each user regardless of the topic of the content item, on the expectation the experts want to maintain their expertise level and will not provide content ratings on content or belief states with which they have little understanding. In some embodiments, the expertise analyzer engine 214 will identify the particular topic associated with the content time, and will generate expert scores for the experts based on their accuracy within the particular topic area. For example, one expert may have high expert scores in politics, but low expert scores in sports. Further, in some embodiments, the expertise analyzer engine 214 will identify regions of interest, and will generate expert scores for the experts based on the accuracy within each particular region. For example, one expert may have a high expert score on California-centric topics, but have a low expert score on international topics.

In some embodiments, the expertise analyzer engine 214 may designate content items that are in need of retrospective evaluation. Expert users may select content items designated for retrospective review to evaluate, possibly for some reward. In some embodiments, the expertise analyzer engine 214 may only enable users who have a particular expertise level to evaluate the content item during the secondary period.

The content ratings store 218 stores the content ratings of content items from the users. In some embodiments, the content ratings may be stored for a predetermined time period, e.g., for 100 days. In some embodiments, the content ratings may be stored until they are determined to be no longer relevant. The content ratings store 218 may store the content scores by content item identifier, e.g., by URL or hash. The data exchange engine 210 may obtain content scores from the content ratings store 218 to provide back to the extension 112 to present to the user, when the user is beginning to consume a content item.

The author score store 220 stores the author scores generated based on the content scores of the content items they authored. The author score store 220 may store the author scores until they are determined to be no longer relevant. The author score store 220 may store the author scores by author identifier, e.g., by name, user ID or email address. The data exchange engine 210 may obtain author scores from the author score store 218 to provide back to the extension 112 to present to the user, when the user is beginning to consume a content item by the author.

The publisher score store 222 stores the publisher scores generated based on the content scores of the content items they published. The publisher score store 222 may store the publisher scores until they are determined to be no longer relevant. The publisher score store 222 may store the publisher scores by publisher identifier, e.g., by name, user ID, or web address. The data exchange engine 210 may obtain publisher scores from the publisher score store 222 to provide back to the extension 112 to present to the user, when the user navigates to the web address, or is beginning to consume a content item published by the publisher.

The expert rewards engine 224 includes hardware, software and/or firmware configured to provide rewards to the experts for their expertise. For example, the social media system 116 may generate revenue. The expert rewards engine 224 may track the revenue, and share the profits with the experts based on their expertise level and participation.

Figure 3:
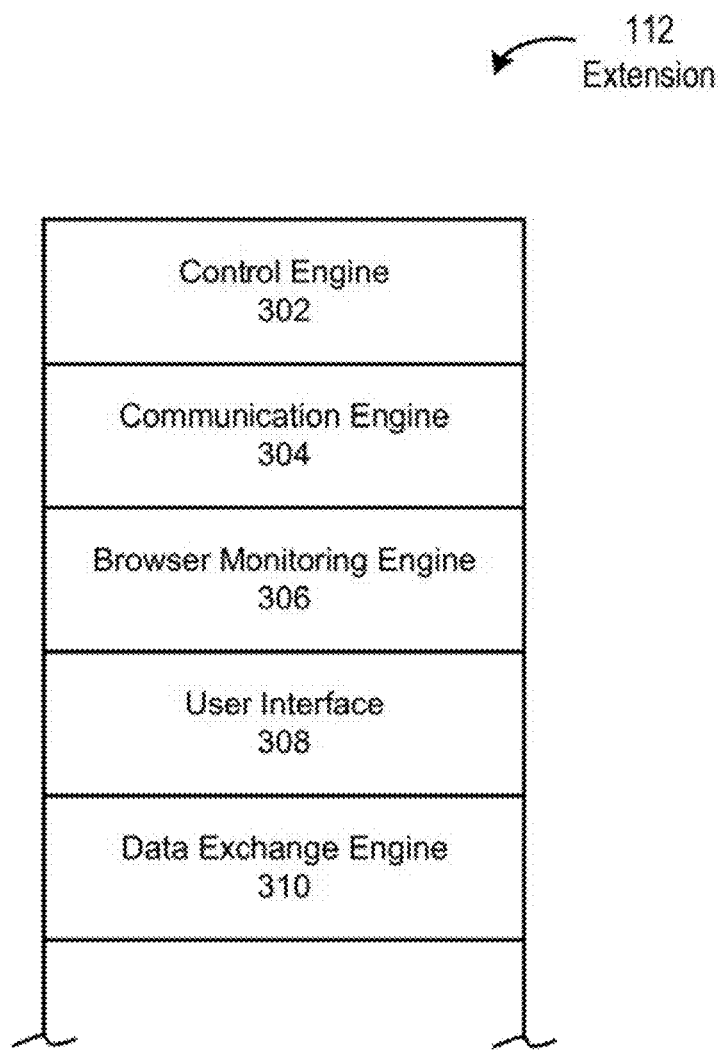
FIG. 3 depicts a block diagram of an example extension, according to some embodiments.

FIG. 3 depicts a block diagram of an example extension 112, according to some embodiments. The extension includes a control engine 302, a communication engine 306, a browser monitoring engine 306, a user interface 308, and a data exchange engine 310.

The control engine 302 includes hardware, software and/or firmware configured to manage the other components of the extension 112. The control engine 302 may launch the user interface 308 to present the rating panel, may launch the data exchange engine 310 to request content scores from the evaluation system 114, etc.

The communication engine 304 includes hardware, software and/or firmware configured to communicate with the computer network 106. The communication engine 304 may function to send requests, transmit and, receive communications, and/or otherwise provide communication with one or a plurality of systems. In some embodiments, the communication engine 304 functions to encrypt and decrypt communications. The communication engine 304 may function to send requests to and receive data from one or more systems through a network or a portion of a network. Depending upon implementation-specified considerations, the communication engine 304 may send requests and receive data through a connection, all or a portion of which may be wireless.

The browser monitoring engine 306 includes hardware, software and/or firmware configured to monitor the user behavior of the user as the user navigates websites, content items, etc. For example, the browser monitoring engine 306 may monitor the length of time the user spends in a content items, the length of time the user spends in various parts of the content item, whether the user navigates to other websites before returning to the content item to provide a content rating, etc.

The user interface 308 includes hardware, software and/or firmware configured to present a rating panel to the user. The rating panel may present content scores generated previously for the content item that the user is currently consuming. The rating panel may request content ratings from the user as to the various belief states, e.g., truthfulness, political bias, etc.

The data exchange engine 310 may exchange information, such as the content scores, content ratings, user behavior data, comments, etc., with the evaluation system 114.

Figure 4:
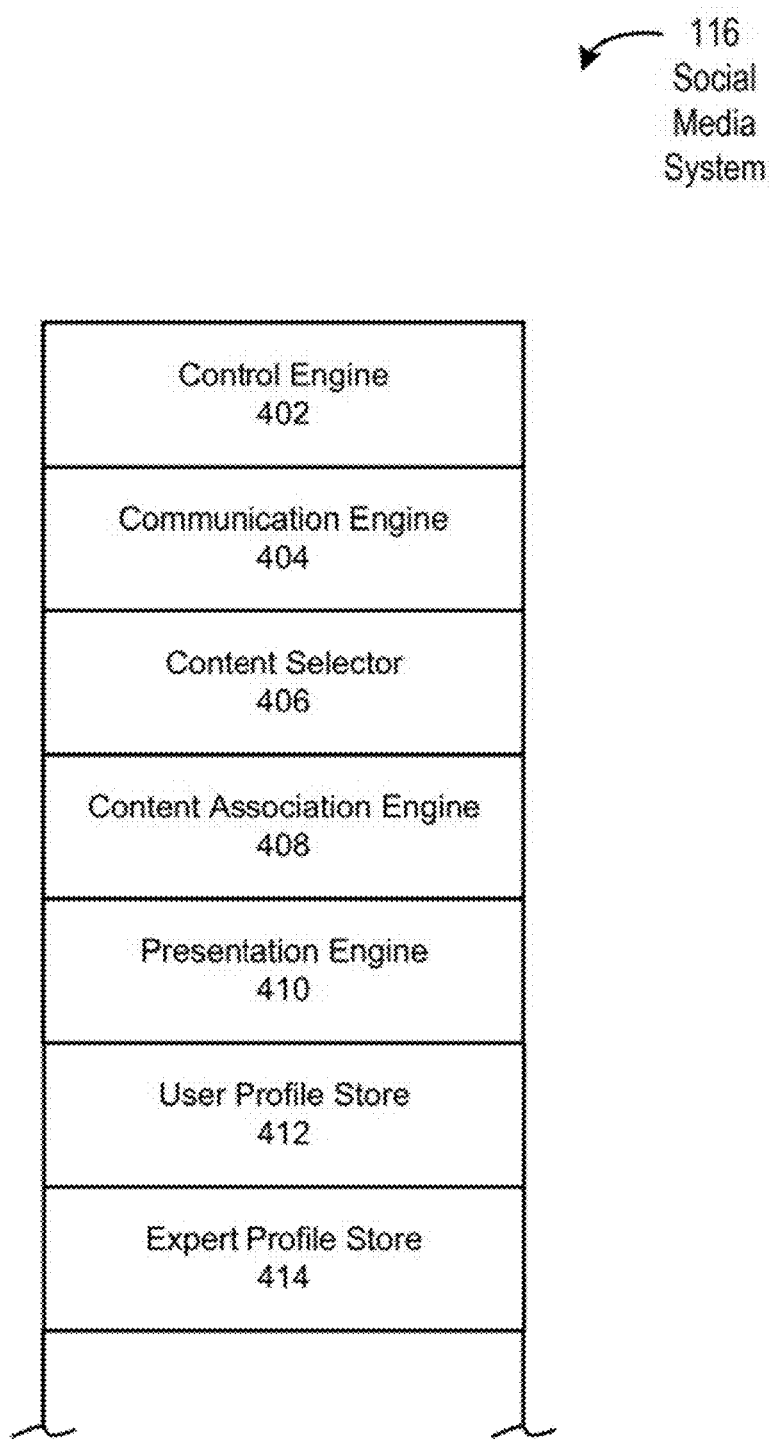
FIG. 4 depicts a block diagram of an example social media system, according to some embodiments.

FIG. 4 depicts a block diagram of an example social media system 116, according to some embodiments. The social media system 116 may include a control engine 402, a communication engine 404, a content selector 406, a content association engine 408, a presentation engine 410, user profile store 412, and expert profile store 412.

The control engine 402 includes hardware, software and/or firmware configured to manage the other components of the social media system 116.

The communication engine 404 includes hardware, software and/or firmware configured to communicate with the computer network 106. The communication engine 404 may function to send requests, transmit and, receive communications, and/or otherwise provide communication with one or a plurality of systems. In some embodiments, the communication engine 404 functions to encrypt and decrypt communications. The communication engine 404 may function to send requests to and receive data from one or more systems through a network or a portion of a network. Depending upon implementation-specified considerations, the communication engine 404 may send requests and receive data through a connection, all or a portion of which may be wireless.

The content selector 406 includes hardware, software and/or firmware configured to select content items for presentation by the social media system 116. The content items may be selected based on the truthfulness ratings, political bias ratings, etc. For example, the content selector 406 may only want to present content items that are highly truthful, regardless of political bias. The content selector 406 may only want to present content items that are highly truthful and have little political bias. Alternatively, the content selector 406 may want to present content items that are highly truthful, but divide the content items into political bias categories, e.g., highly liberal content items, neutral content items, highly conservative content items. For example, a user who follows more liberal ideals may want to read content items that are pro-Democrat or alternatively content items that are pro-Republican. In some embodiments, users may present content items to be included. Trusted users, e.g., authors with high truthfulness scores, may present content items to be included.

The content association engine 408 includes hardware, software and/or firmware configured to associate content items with the social media system 116. Content association may include providing a link to the content item. Content association may include capturing content items from other publishers and re-publishing the content items on a website generated by the social media system 116. Content association may include sourcing new content generated by particular authors. In some embodiments, the content sourced by the social media system 116 may include content requested from authors who have achieved certain author scores, e.g., highly truthful authors who source content items with highly low political bias.

The presentation engine 410 includes hardware, software and/or firmware configured to present associated content to users of the social media system 116. The presentation engine 410 may present a list of categories, from which the user selects content items. The presentation engine 410 may present content feeds which present trending content items on trending topics, etc. The presentation engine 410 may enable users to search for content items using search terms, topic searches, author searches, friend searches, etc. In some embodiments, users may become followers of other users. For example, user A may post a recommended article, which becomes listed on the news feed of all other users who are friends with user A. Friends of user A who view this article have the option of providing truthfulness and political bias ratings on the article. In some embodiments, a user may navigate to a personal activity wall to view content generated by connected friends. The user may click links to news articles on his wall, visit sponsors who purchase advertisements, or post news articles which appear on his wall and also are shared on the walls of his friends.

The user profile store 412 may store user profiles of users of the social media system 116. In some embodiments, the user profile store 412 may store user profiles of all users who subscribe to the social media system 116. The user profile store 412 may store user profiles for everyone who visits, e.g., by maintaining a user identifier, using cookies, etc. In some embodiments, the presentation engine 412 presents the user profile to the user for updating or review.

The expert profile store 412 may store the expert profiles of users of the social media system 116. In some embodiments, the user profile store 412 only stores expert profiles for users who have generated at least one content rating. In some embodiments, the user profile store 412 only stores expert profiles for users who have generated at least one content rating within a predetermined period of time, such as within the last month, quarter, year, 4 years, a Presidential term, etc. In some embodiments, the presentation engine 412 presents the expert profile to the expert for updating or review. In some embodiments, the user can enter the personal profile section and inputs personal data such as contact information, profile photos, professional interests and affiliations, academic interests and affiliations, and personal interests. The user can also manage his personal connections, such as adding or removing friends.

Figure 5:
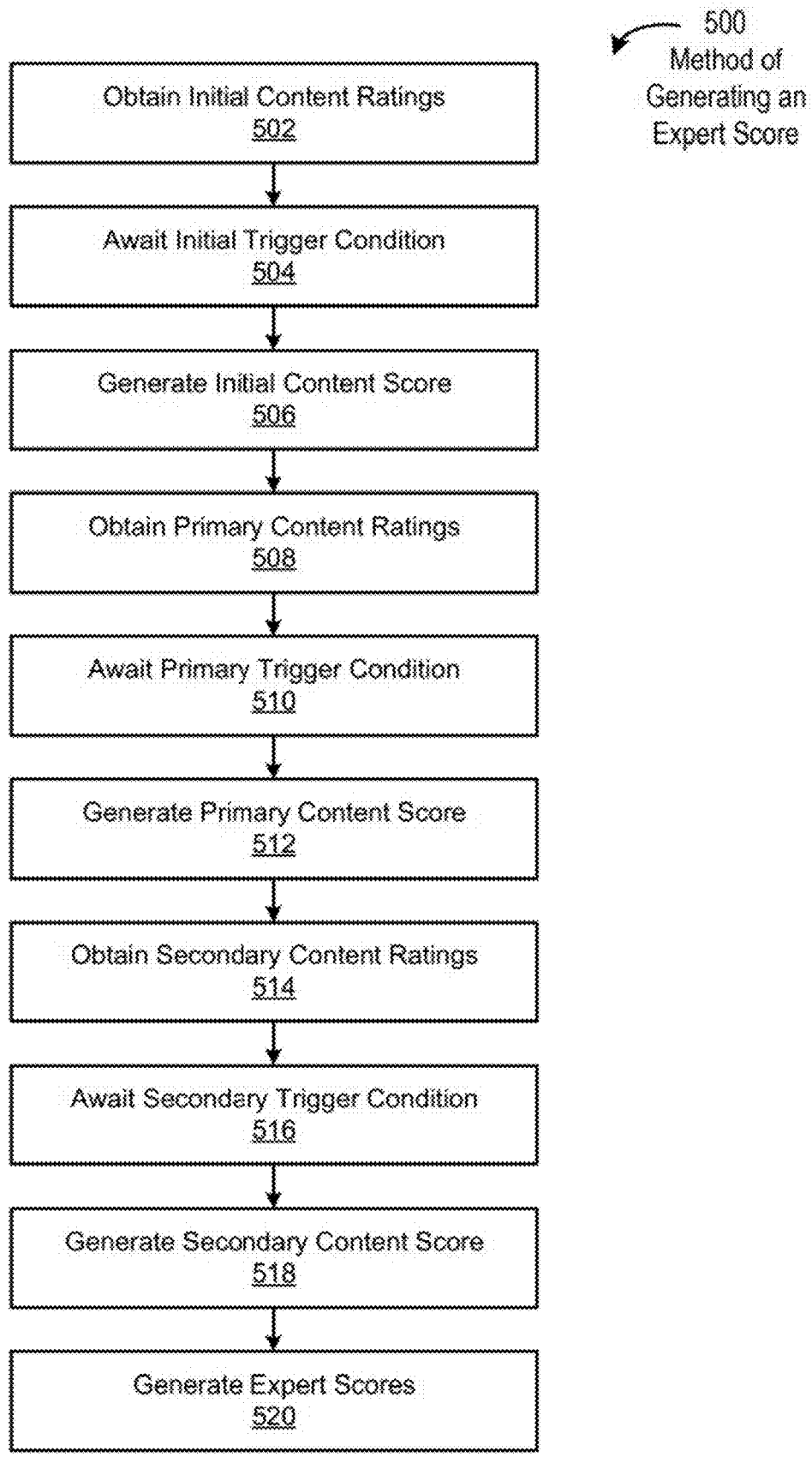
FIG. 5 depicts a flow diagram of an example method of scoring content and experts, according to some embodiments.

FIG. 5 depicts a flow diagram of an example method 500 of scoring content items and experts, according to some embodiments. Method 500 begins in step 502 with the evaluation system 114 obtaining initial content ratings as to a belief state during an initial period from initial users. In step 504, the evaluation system 114 awaits an initial trigger condition that marks the end of the initial period. For example, the initial trigger condition may include having received a predetermined number of initial content ratings (e.g., 1, 5, 10 or 100) as to the belief state, a manual event, a predetermined length of time, etc. Upon satisfying the initial trigger condition, the evaluation system 114 generates an initial content score, which will be provided to subsequent users. In some embodiments, prior to obtaining an initial content score, the evaluation system 114 will not provide any content score to the user.

In step 508, during a primary period, the evaluation system 114 obtains primary content ratings as to the belief state from primary users. In step 510, the evaluation system 114 awaits a primary trigger condition that marks the end of the primary period. The primary trigger condition may include a predetermined number of primary content ratings (e.g., 100), a predetermined period of time (e.g., 1 or 2 days), a predetermined date and time (e.g., midnight on day 1), an external event (e.g., sundown or the end of a show), a manual event, etc. In step 512, the evaluation system 114 generates the primary content score based on content ratings received from the initial users and primary users (who provided scores during the initial period and the primary period).

In step 514, during a secondary period, the evaluation system 114 obtains secondary content ratings from secondary users. In step 516, the evaluation system 114 awaits a secondary trigger condition that marks the end of the secondary period. The secondary trigger condition may include a predetermined number of primary content ratings (e.g., 50), a predetermined period of time (e.g., 1 day), a predetermined date and time (e.g., midnight on day 2), an external event (e.g., sundown or the end of a show), a manual event, etc. In step 518, the evaluation system 114 generates a secondary content score. In step 520, the evaluation system 114 generates expert scores based on a comparison between the secondary content scores and the primary ratings of the primary users and between the secondary content scores and the initial ratings of the initial users.

Figure 6:
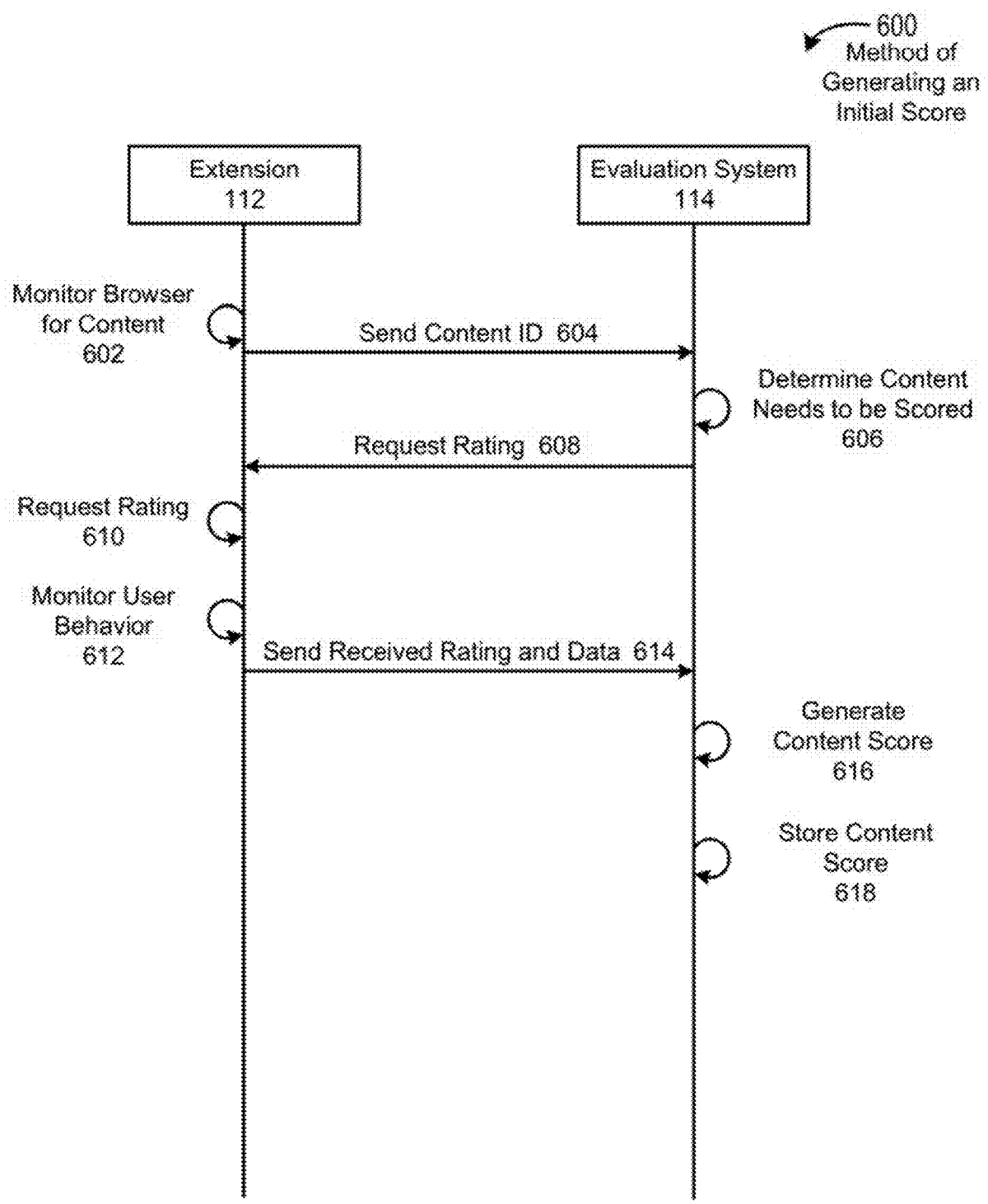
FIG. 6 depicts a flow diagram of an example method of generating an initial content score of a content item, according to some embodiments.

FIG. 6 depicts a flow diagram of an example method 600 of generating an initial content score of a particular content item, according to some embodiments. The method 600 begins in step 602 with the extension 112 (e.g., the browser monitoring engine 306) monitoring the browser for content items being consumed by the user. In step 604, the extension 112 (e.g., the data exchange engine 310) sends the content identifier (e.g., the URL or hash of the content item) to the evaluation system 114 (e.g., the data exchange engine 210). In step 606, the evaluation system 114 (e.g., the content identifier engine 206) determines whether the content identifier is associated with content to be scored and whether it has a score. If there is no content score, then in step 608, the evaluation system 114 (e.g., the data exchange engine 210) sends a request for a content rating to the extension 112 (e.g., the data exchange engine 310). In step 610, the extension 112 (e.g., the user interface 308) presents the content rating request to the user. In step 612, the extension 112 (e.g., the browser monitoring engine 306) monitors the user behavior as the user consumes the content item. In step 614, the extension 112 (e.g., the data exchange engine 310) sends the user behavior information and the content rating to the evaluation system 114 (e.g., the data exchange engine 210). In step 616, the evaluation system 114 (e.g., the content scoring engine 212) applies the user behavior information and applies Bayesian probabilities the content rating from this user the content ratings from other uses, to generate an initial content score. In step 618, the evaluation system 114 (e.g., the content ratings store 218) stores the initial content ratings and the initial content score in the content ratings store 218.

Figure 7:
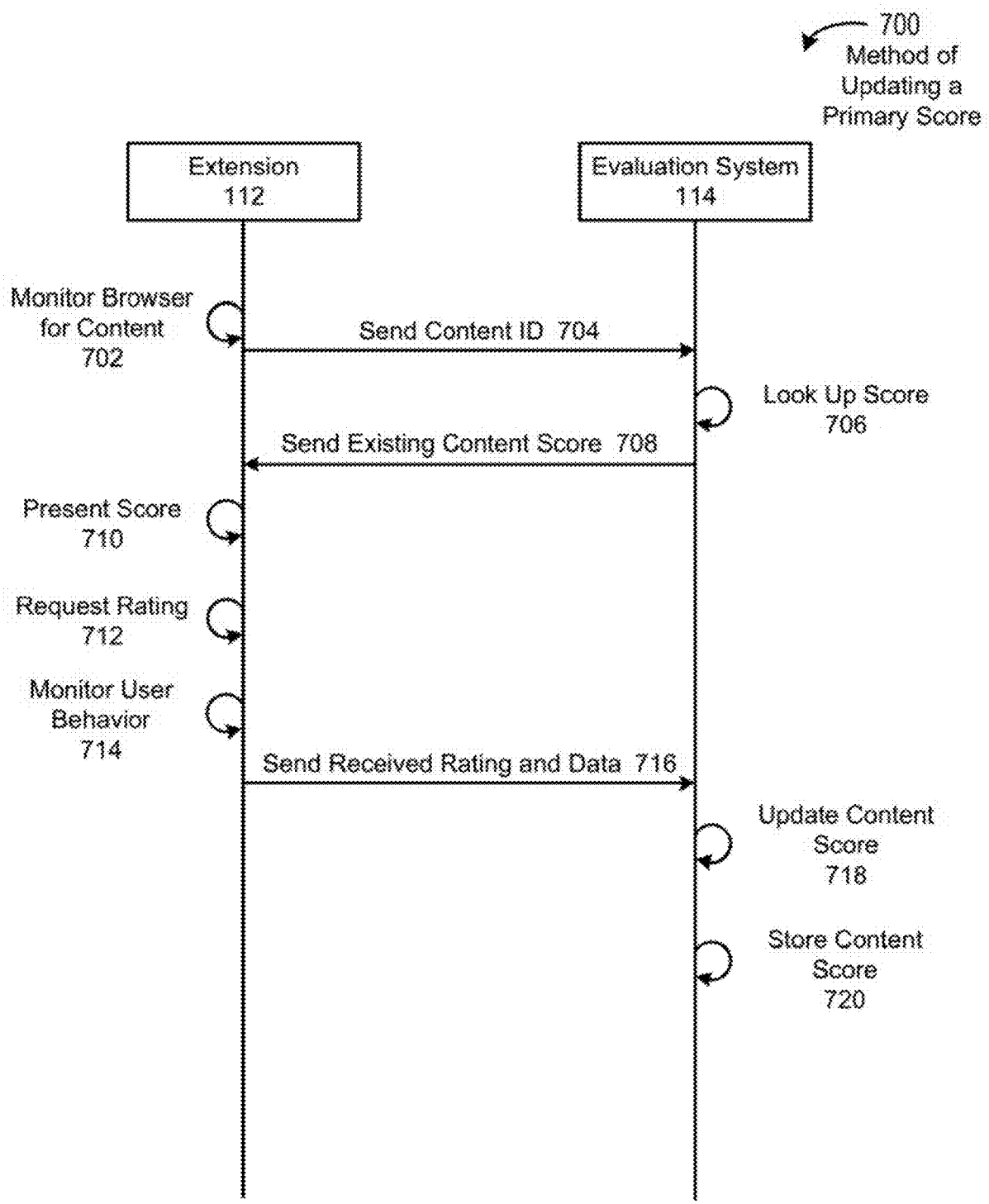
FIG. 7 depicts a flow diagram of an example method of generating a primary content score of a content item, according to some embodiments.

FIG. 7 depicts a flow diagram of an example method 700 of generating a primary content score of a particular content item, according to some embodiments. The method 700 begins in step 702 with the extension 112 (e.g., the browser monitoring engine 306) monitoring the browser for content items being consumed by the user. In step 704, the extension 112 (e.g., the data exchange engine 310) sends the content identifier (e.g., the URL or hash of the content item) to the evaluation system 114 (e.g., the data exchange engine 210). In step 706, the evaluation system 114 (e.g., the content identifier engine 206) determines whether the content identifier is associated with content to be scored and whether it has already received a score. If it has already received a score, then in step 708, the evaluation system 114 (e.g., the data exchange engine 210) sends an current content score to the extension 112 (e.g., the data exchange engine 310). In step 710, the extension 112 (e.g., the user interface 308) presents the current content score to the user and in step 712 requests a content rating from the user. In step 714, the extension 112 (e.g., the browser monitoring engine 306) monitors the user behavior as the user consumes the content item. In step 716, the extension 112 (e.g., the data exchange engine 310) sends the user behavior information and the content rating to the evaluation system 114 (e.g., the data exchange engine 210). In step 718, the evaluation system 114 (e.g., the content scoring engine 212) applies the user behavior information and applies Bayesian probabilities on the content rating from this user and on the current content score, to update the current content score to a new content score. In step 720, the evaluation system 114 (e.g., the content ratings store 218) stores the content rating and the new content score in the content ratings store 218.

Figure 8:
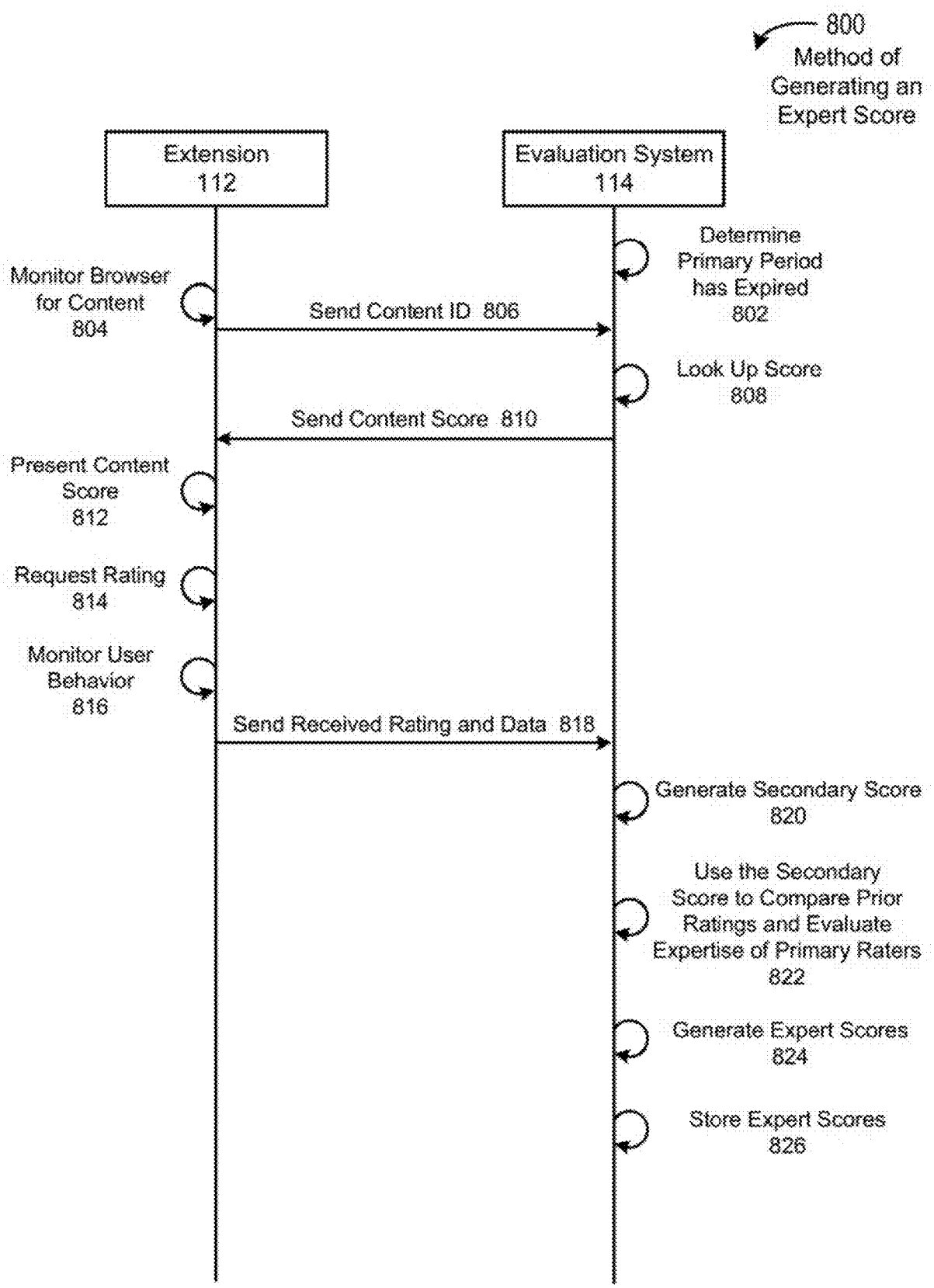
FIG. 8 depicts a flow diagram of an example method of generating an expert score, according to some embodiments.

FIG. 8 depicts a flow diagram of an example method 800 of generating an expert score, according to some embodiments. The method 800 begins in step 802 with the evaluation system 114 (e.g., the control engine 202 or the expertise analyzer engine 214) determining that the primary period has expired. In step 804, the extension 112 (e.g., the browser monitoring engine 306) monitoring the browser for content items being consumed by the user during the secondary period. In step 806, the extension 112 (e.g., the data exchange engine 310) sends the content identifier (e.g., the URL or hash of the content item) to the evaluation system 114 (e.g., the data exchange engine 210). In step 808, the evaluation system 114 (e.g., the content identifier engine 206) uses the content identifier to identify the content to be scored and to retrieve the current primary content score. In step 810, the evaluation system 114 (e.g., the data exchange engine 210) sends the primary content score to the extension 112 (e.g., the data exchange engine 310). In step 812, the extension 112 (e.g., the user interface 308) presents the primary content score to the user. In step 814, the extension 112 (e.g., the user interface 308) requests the user to provide a content rating. In step 816, the extension 112 (e.g., the browser monitoring engine 306) monitors the user behavior as the user consumes the content item. In step 818, the extension 112 (e.g., the data exchange engine 310) sends the user behavior information and the content rating to the evaluation system 114 (e.g., the data exchange engine 210). In step 820, the evaluation system 114 (e.g., the content scoring engine 212) applies the user behavior information and applies Bayesian probabilities on the content rating from this user, and on the content ratings from other users during the secondary period, to generate a secondary content score. In step 822, the evaluation system 114 (e.g., the expertise analyzer engine 214) compares the secondary content score against prior content ratings of the initial users and primary users who provided content ratings during the initial period and the primary period to evaluate expertise. In step 824, the evaluation system 114 (e.g., the expertise analyzer engine 214) generates expert scores based on the comparison. In step 826, the evaluation system 114 (e.g., the content ratings store 218) stores the expert stores in the expert score store 216.

Figure 9:
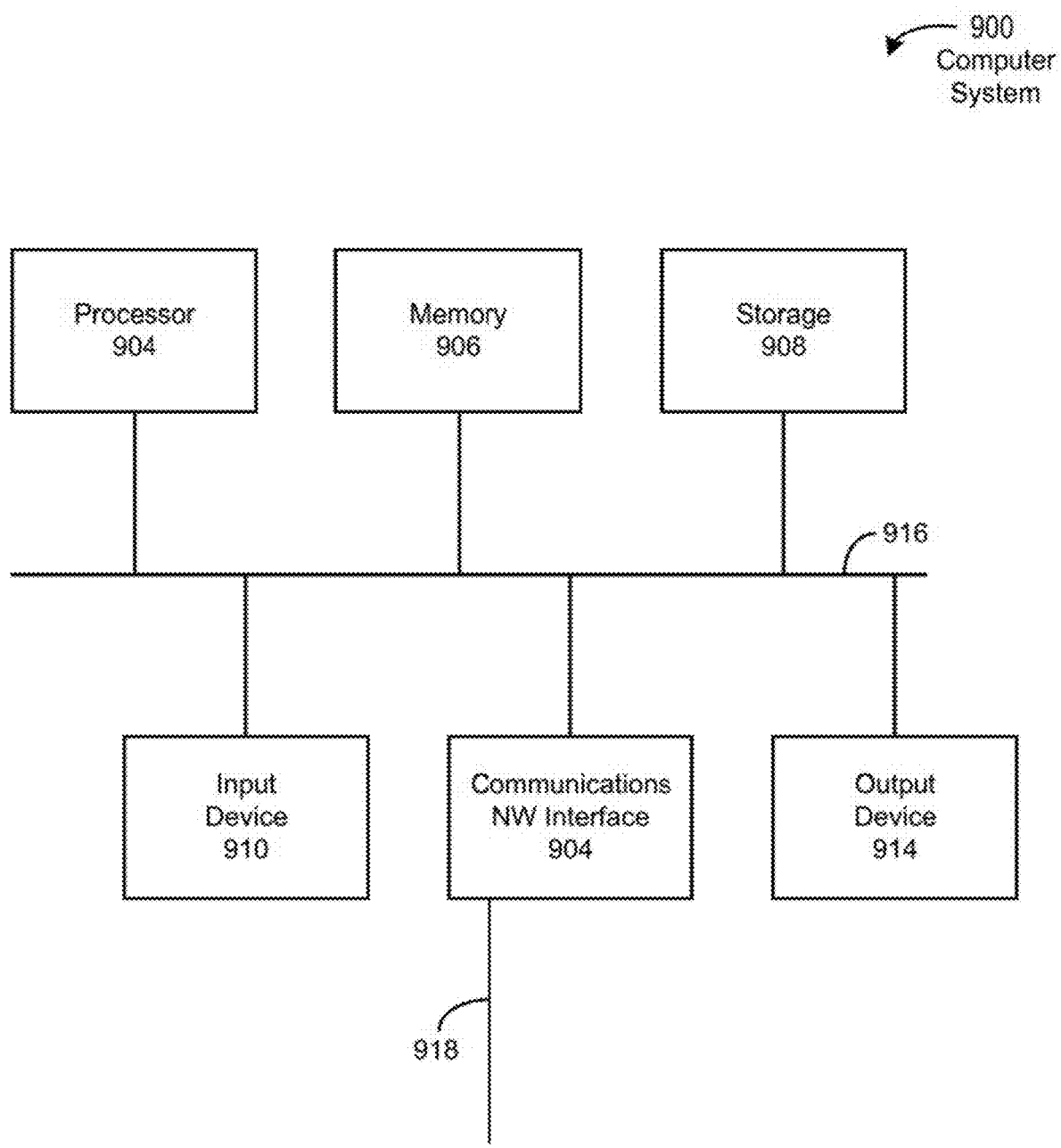
FIG. 9 depicts a diagram of an example computer system for implementing the features disclosed herein, according to some embodiments.

FIG. 9 depicts a block diagram of an example of a computing device 900. Any of the systems 102, 104 and/or 108, and the communication network 106 may comprise an instance of one or more computing devices 900. The computing device 900 comprises a hardware processor 904, memory 906, storage 908, an input device 910, a communication network interface 912, and an output device 914 communicatively coupled to a communication channel 916. The processor 904 is configured to execute executable instructions (e.g., programs). In some embodiments, the processor 904 comprises circuitry or any processor capable of processing the executable instructions.

The memory 906 stores data. Some examples of memory 906 include storage devices, such as RAM, ROM, RAM cache, virtual memory, etc. In various embodiments, working data is stored within the memory 906. The data within the memory 906 may be cleared or ultimately transferred to the storage 908.

The storage 908 includes any storage device configured to retrieve and store data. Some examples of the storage 908 include flash drives, hard drives, optical drives, cloud storage, and/or magnetic tape. Each of the memory system 906 and the storage system 908 comprises a computer-readable medium, which stores instructions or programs executable by processor 904. The distinction between memory 906 and storage 908 has been blurring, so memory 906 and storage 908 should be treated interchangeably.

The input device 910 includes any device that receives data (e.g., mouse and keyboard). The output device 914 includes any device that presents data (e.g., a speaker and/or display).

The communication network interface 912 may be coupled to a network (e.g., network 106) via the link 918. The communication network interface 912 may support communication over an Ethernet connection, a serial connection, a parallel connection, and/or an ATA connection. The communication network interface 912 may also support wireless communication (e.g., 802.11 a/b/g/n, WiMax, LTE, WiFi) or wired communication.

The hardware elements of the computing device 900 are not limited to those depicted in FIG. 9. A computing device 902 may comprise more or less hardware, software and/or firmware components than those depicted (e.g., drivers, operating systems, touch screens, biometric analyzers, and/or the like). In certain circumstances, the storage 908, input device 910, and output device 914 may be optional. Further, hardware elements may share functionality and still be within various embodiments described herein. In one example, encoding and/or decoding may be performed by the processor 904 and/or a co-processor located on a GPU (e.g., Nvidia GPU).

Figure 10:
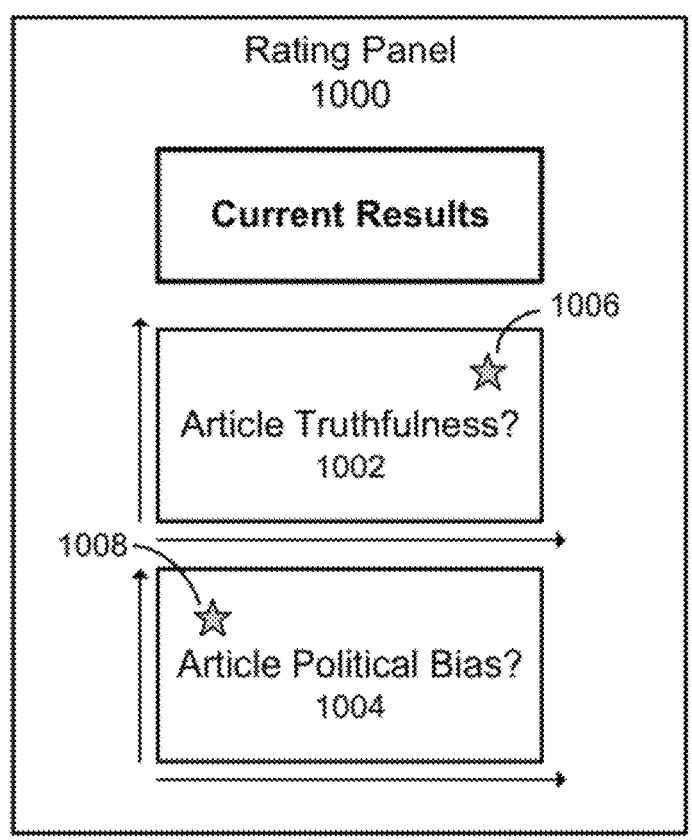
FIG. 10 depicts an example rating panel, according to some embodiments.

FIG. 10 depicts an example rating panel 1000, according to some embodiments. The extension 112 may present the rating panel 1000 adjacent to or on top of the content item associated with it. In some embodiments, the rating panel 1000 may request the user to input one or more belief states associated with the content item. As shown, the example rating panel 1000 has a truthfulness belief state interface 1002 requesting a truthfulness belief state rating and has a political bias belief state interface 1004 requesting a political bias belief state rating. As shown, the user placed a star 1006 to the high side of the truthfulness interface 1002 representing an opinion that the content item is highly truthful, and the user placed a star 1008 to the low side of the political bias interface 1004 representing an opinion that the content item has low political bias. In other embodiments, the user may be able to rate the belief state in different interfaces.

Figure 11:
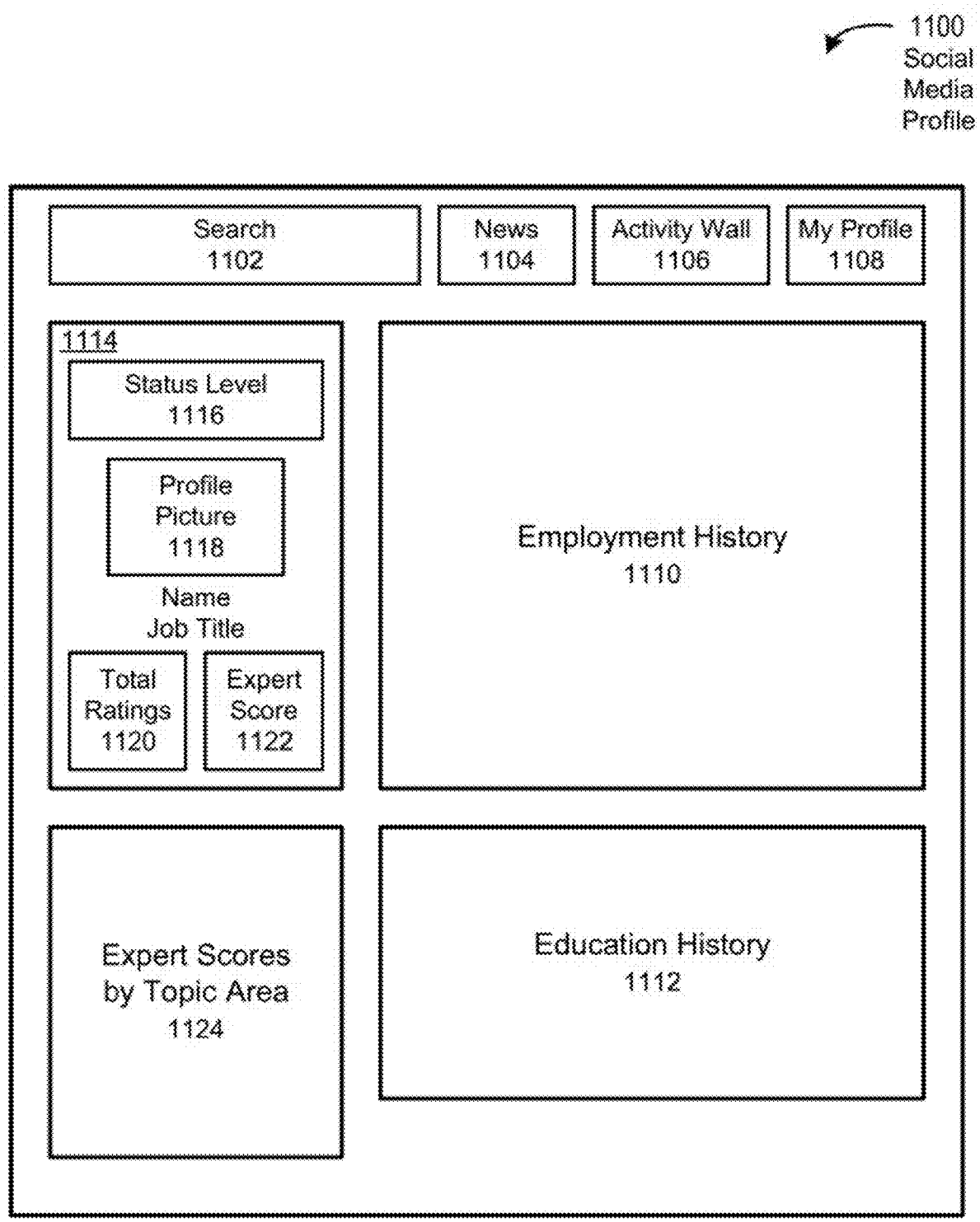
FIG. 11 depicts an example social media profile, according to some embodiments.

FIG. 11 depicts an example social media profile 1100, according to some embodiments. As stated above, the social media system 116 may generate a social media site for users, to support content item filtering and consumption and to support expert development. As shown, the social media profile 1100 may include a search bar 1102, a news tab 1104, an activity wall 1106, a profile tab 1108, an employment history field 1110, an education history field 1112, a user identifier field 1114 and an expert score field 1124. The user identifier field 1114 may include a status level indicator 1116, a profile picture 1118, a total ratings indicator 1120, and an expert score indicator 1122. In addition to content item aggregation, the social media side may also host a social media environment to link users together as a community. Similar to other social media communities, the social media system 116 may allow users to create a profile for free and to share personal information on an individualized profile page. The profile page may display information about the history of the user's ratings, and a total number of ratings that a user has conducted. The profile page may also assign an aggregate expert score to the user based on the accuracy of the user's ratings. Based on these two metrics, the user may be assigned a status level. The status level may recognize those users who have rated often and accurately. The profile page may offer the user an opportunity to display a photo along with employment and education information. In some embodiments, the expert score may also be broken down by topic to specifically recognize the expertise of the user.

Figure 12:
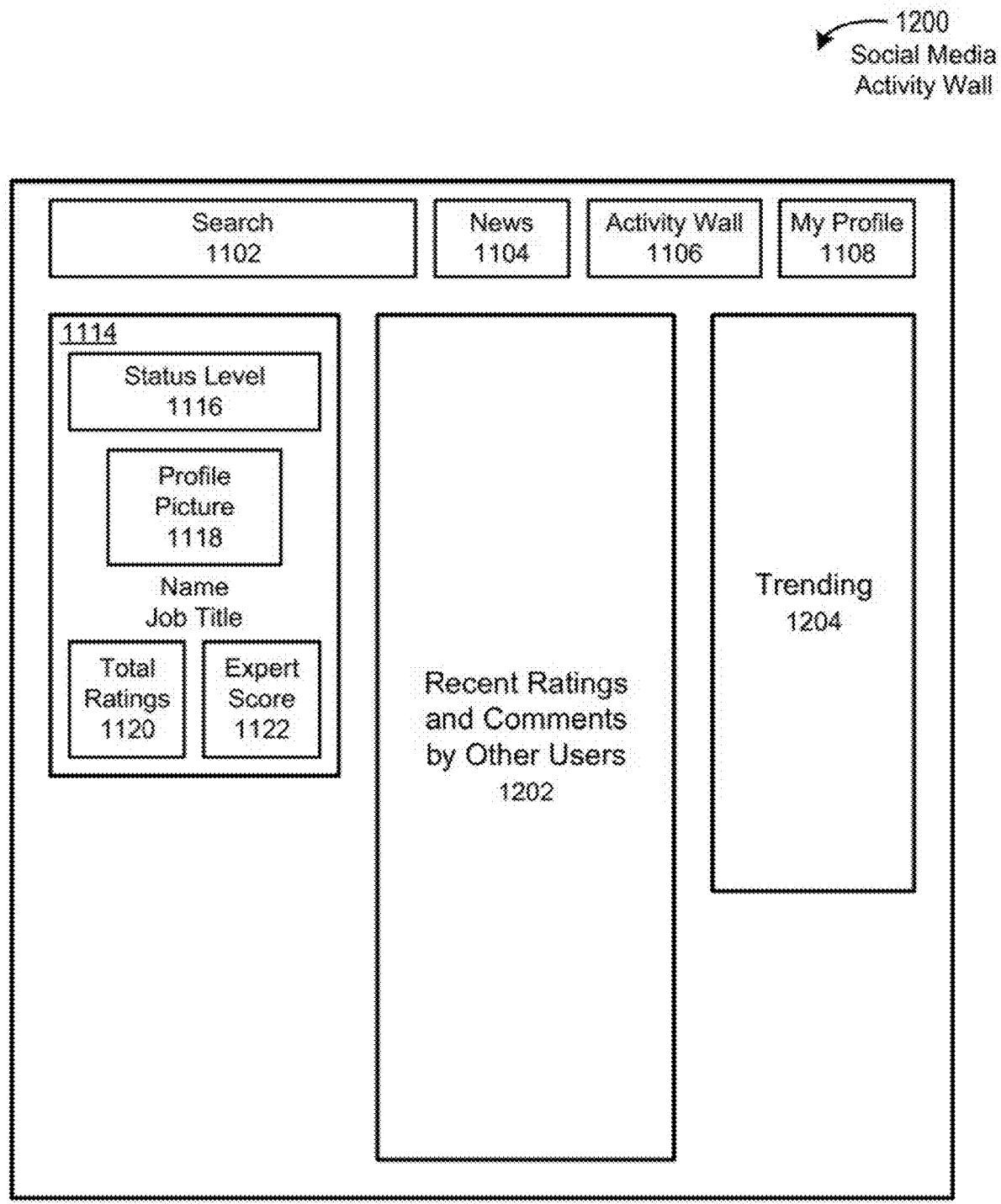
FIG. 12 depicts an example social media activity wall, according to some embodiments.

FIG. 12 depicts an example social media activity wall 1200, according to some embodiments. In addition to some of the elements of FIG. 11 (such as the picture, name, job title, status level, total ratings, and expert score), the social media activity wall 1200 may display in a field 1202 recent comments by other users linked to this specific user and recent ratings of content items identified as of interest to this user. The social activity wall 1200 may also display in a field 1204 content items trending among the users that are performing ratings, other users linked to this user, or topics identified as of interest to this user.

Figure 13:
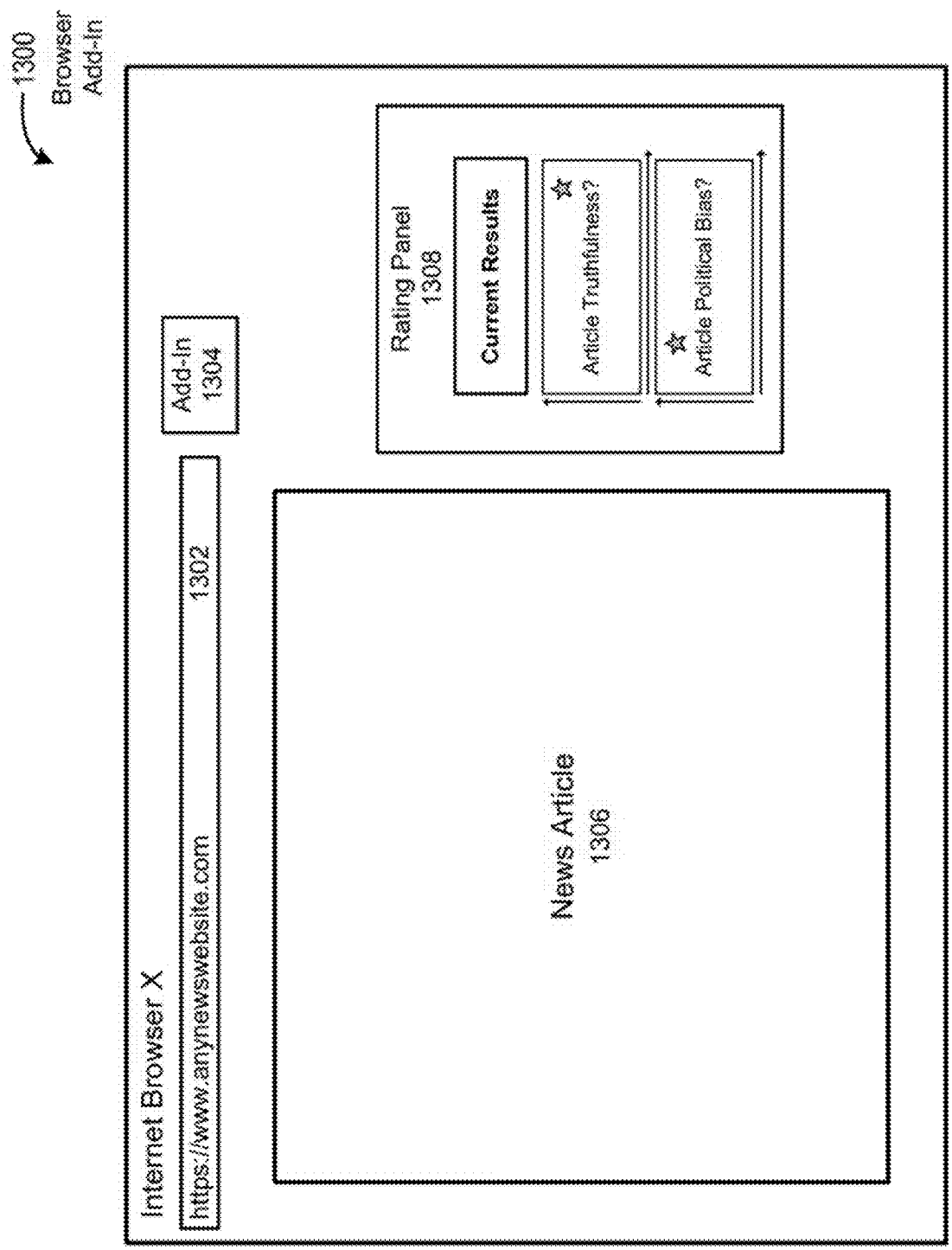
FIG. 13 depicts an example window generated by the extension, according to some embodiments.

FIG. 13 depicts an example window 1300 generated by the extension 112, according to some embodiments. The window 1300 includes a URL field 1302 identifying the URL location of a content items, a field 1306 presenting the content item (e.g., a news article), and a rating panel 1308 similar to the rating panel 1000. The window 1304 further includes an extension tab (labeled as "Add-in") 1304, which when selected causes the extension 112 to present the rating panel 1308. Much like other extensions, the extension tab 1304 may ride on top of the browser window 1300, and will not affect the basic function of that browser 110. If the user is reading the news article contained in field 1306, the extension 112 will identify the content item using the URL contained in the URL field 1302, will display the rating panel 1308 for that particular news article, and will offer the user to rate the news article (even if it has not been previously rated).

Figure 14:
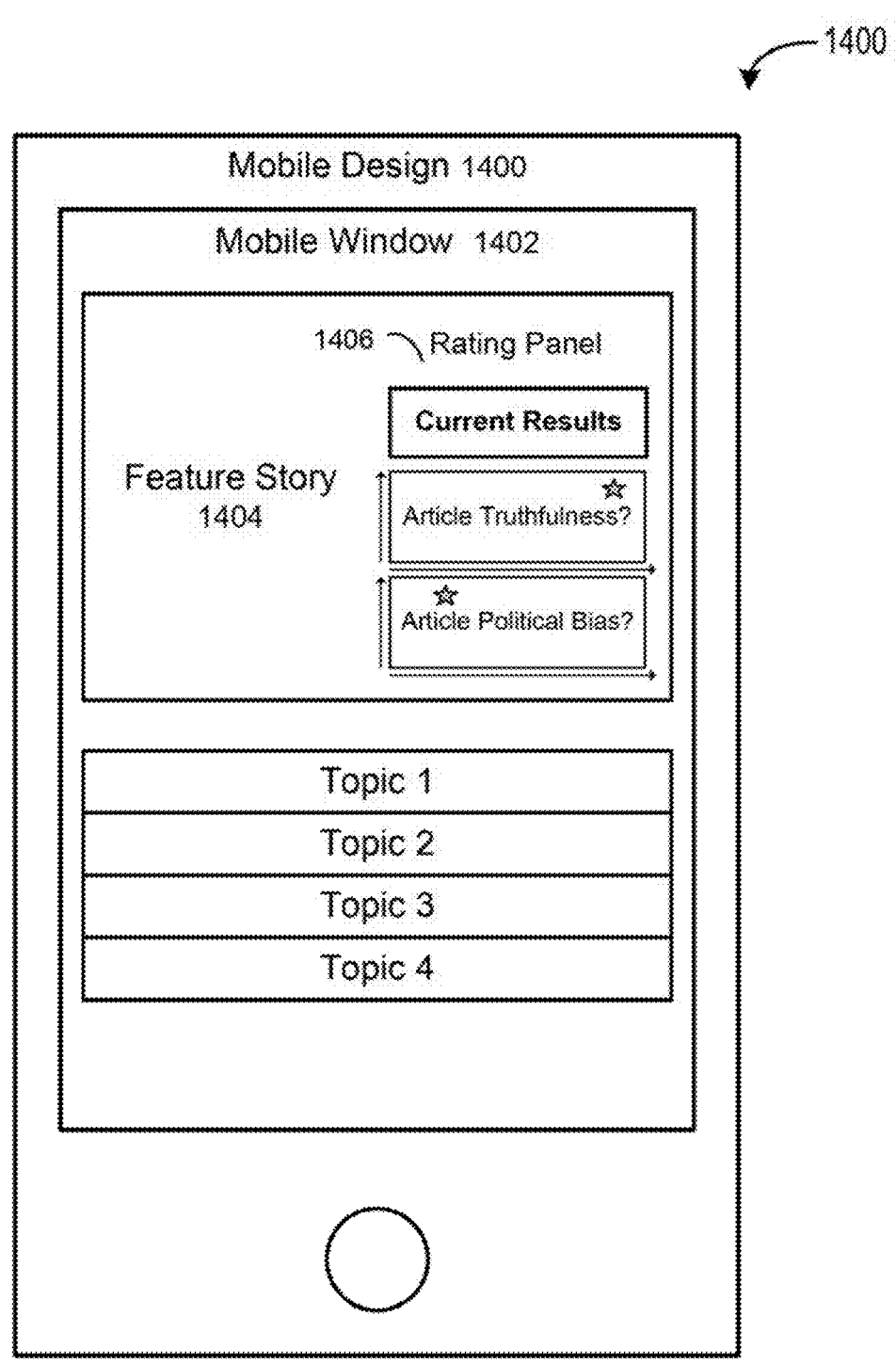
FIG. 14 depicts a mobile device having an example window generated by the extension, according to some embodiments.

FIG. 14 depicts an example mobile device 1400 having a mobile extension window 1402 generated by the extension 112, according to some embodiments. The window 1402 may include a field 1404 displaying a content item (e.g., a feature story). Adjacent to the field 1404, the extension 112 may generate a rating panel 1406 to request user to rate the content item as to one or more belief states. The window 1402 may present similar content items in a more simplified, mobile friendly display environment. Users may also be able to provide rating feedback using the rating panel 1406. Topic listings (Topic 1, Topic 2, Topic 3 and Topic 4) will automatically be prioritized based on user defined preferences combined with online activity.

Figure 15:
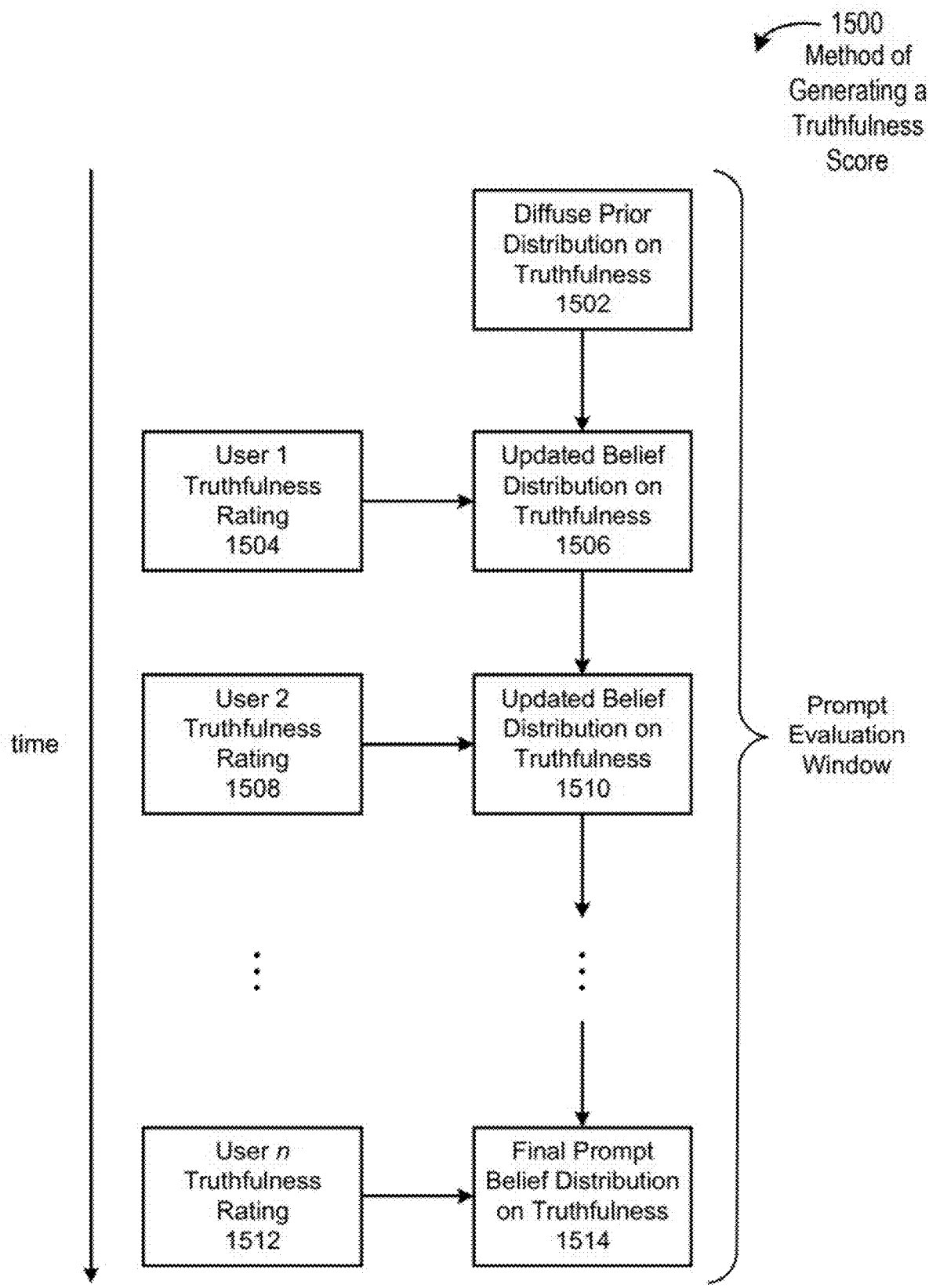
FIG. 15 depicts a flowchart of an example method of using Bayesian statistics to generate a truthfulness score, according to some embodiments.

FIG. 15 depicts a flowchart of an example method 1500 of using Bayesian probabilities to generate a prompt truthfulness score, according to some embodiments. As described above, the collective set of evaluations represents the user population's prior belief state of the content item. Various embodiments use Bayesian updating methods to modify the belief state over two time windows: a primary period and secondary period. In the primary period (nominally hours-to-days, representing prompt evaluations of a newly published content item), as ratings are submitted, the evaluation system 114 uses Bayesian updating to update the collective belief state regarding the truthfulness of the content item.

The method 1500 begins in step 1502 with the evaluation system 114 diffusing a prior distribution on truthfulness. The evaluation system 114 in step 1504 receives a truthfulness rating from a first user and in step 1506 uses Bayesian updating to update the distribution on truthfulness. The evaluation system 114 in step 1508 receives a truthfulness rating from a second user and in step 1510 uses Bayesian updating to update again the distribution on truthfulness. The evaluation system 114 repeats this n times. As shown, the evaluation system 114 in step 1512 receives a truthfulness rating from an nth user and in step 1514 uses Bayesian updating to update again the distribution on truthfulness.

Figure 16A:
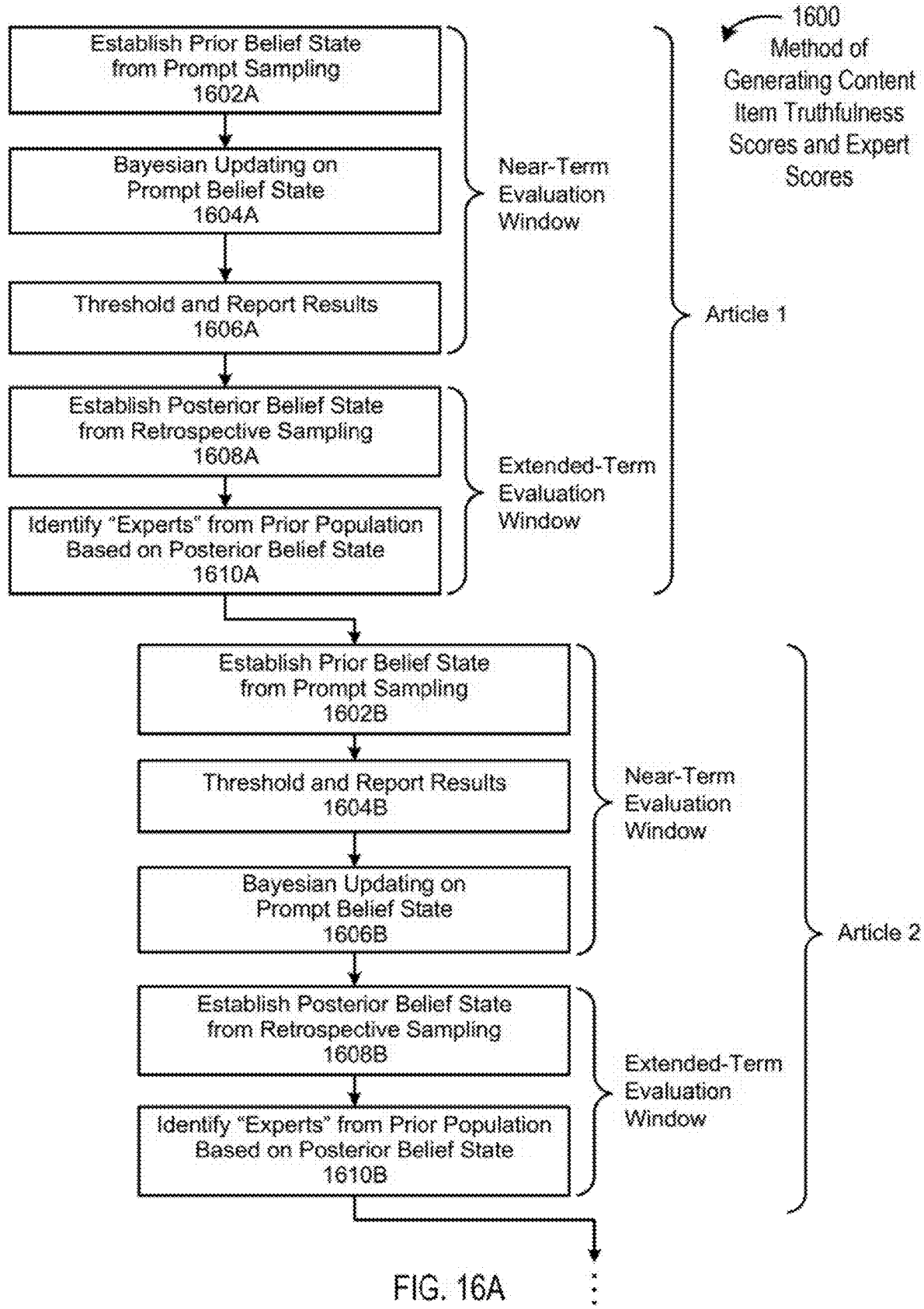
FIGS. 16A and 16B depict a flowchart of an example method of using Bayesian statistics to generate truthfulness scores and expert scores, according to some embodiments.
Figure 16B:
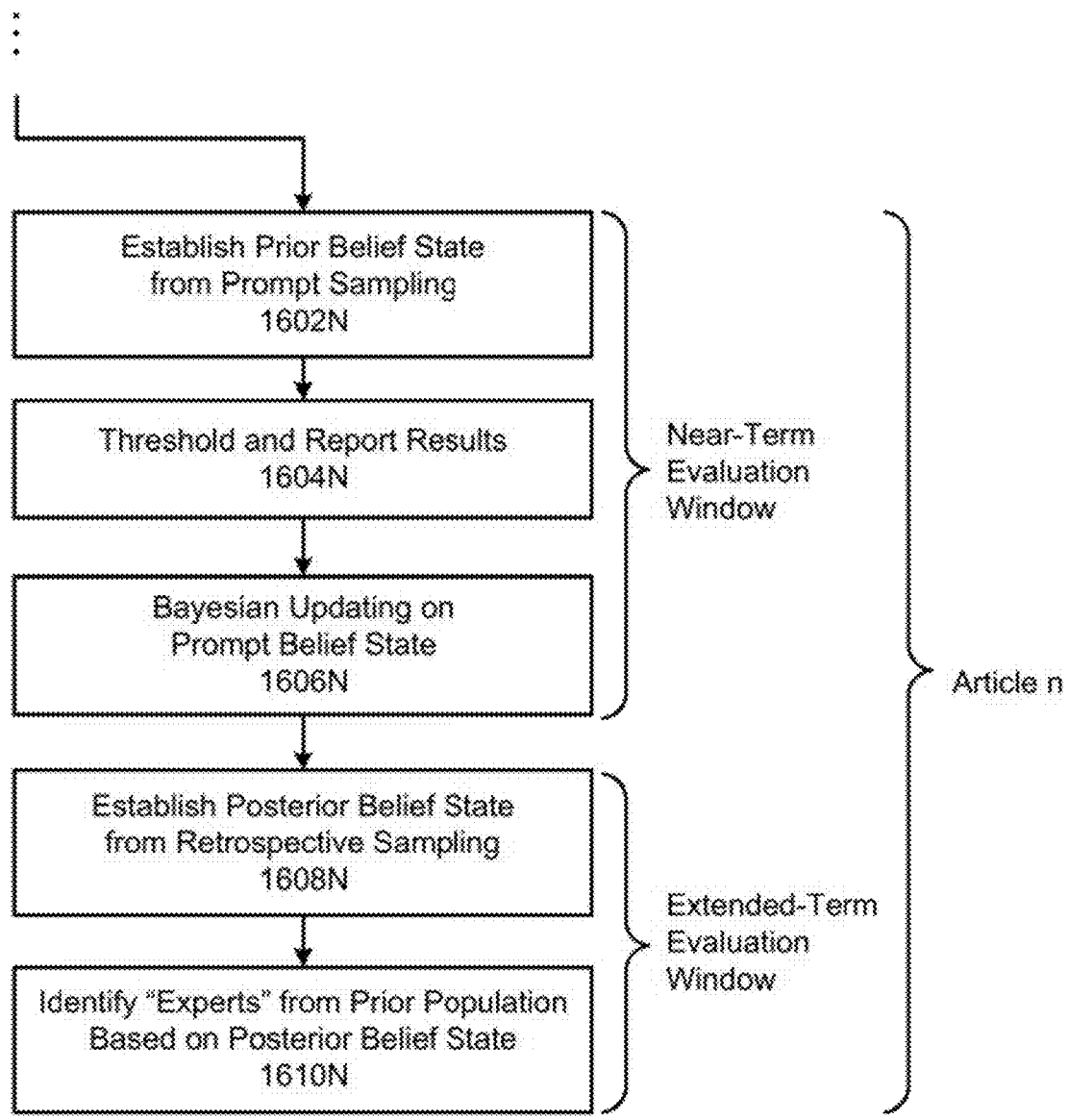

FIGS. 16A and 16B depict a flowchart of an example method 1600 of using Bayesian probabilities to generate truthfulness scores and expert scores, according to some embodiments. Various embodiments use Bayesian updating techniques to modify the belief state (e.g., truthfulness) over two time windows: a primary period and a secondary period. The evaluation system 114 may compare the truthfulness ratings submitted in the primary period (nominally hours-to-days, representing prompt evaluations of a newly published content item), against truthfulness ratings provided in the secondary period to evaluate expertise.

As shown, the method 1600 includes a truthfulness evaluation process that repeats for N content items (e.g., articles). The method 1600 begins a primary period for a first content item (e.g., article 1) in step 1602A, during which the evaluation system 114 receives an initial sampling of user ratings to establish a prior belief state (e.g., a truthfulness state) from the initial sampling. The method 1600 continues in step 1604A during which the evaluation system 114 uses Bayesian updating techniques to update the initial belief state with additional user ratings received during the primary period. The method 1600 continues until the conclusion of the primary period in step 1606A by the evaluation system 114 generating a belief-state score (e.g., a truthfulness score). The method 1600 begins secondary period in step 1608A, during which the evaluation system 114 receives a set of retrospective ratings from users as to the belief state and generates a retrospective belief-state score from the retrospective sampling. The method 1600 continues until the conclusion of the secondary period in step 1610A by the evaluation system 114 uses the retrospective belief-state score to evaluate users to identify experts from the users who rated the belief state of the content item during the initial period and primary period. The method 1600 continues in steps 1602B, 1604B, 1606B, 1608B and 1610B for a second content item (e.g., article 2). The method 1600 repeats for N content items, the evaluation of the Nth content item (e.g., article N) being shown in steps 1602N, 1604N, 1606N, 1608N and 1610N. Further details of method 1600 are provided below.

Primary Time Period

Starting with a diffuse prior (either a variant of a Normal distribution or beta(1,1)) as users provide ratings on the truthfulness of a content item, the belief state distribution is updated in a sequential fashion in the following manner:

Suppose user n believes that the truthfulness of a content item is rated as a value $C/N \in (0,1)$. The evaluation system 114 uses Bayesian updating to formulate the posterior distribution on the truthfulness of the content item, given a diffuse prior, as given by $$P(\pi \mid C, N) = \frac{P(C, N \mid \pi)P(\pi)}{P(C, N)},$$

where $\pi$ is the truthfulness parameter. The likelihood function, or the probability of observing the truthfulness rating C/N given $\pi$ is defined as $$P(C, N \mid \pi) = \binom{N}{C}\pi^C(1-\pi)^{N-C},$$

since the evaluation system 114 treats the C/N rating as a proxy for the total proportion of times that C truthful content items will be observed among N total content items. Therefore, the evaluation system 114 treats the likelihood function as a binomial distribution function. The marginal likelihood, or evidence, is given by $$P(C, N) = \int_0^1 P(C, N \mid \pi)P(\pi)d\pi.$$

Assuming the prior distribution can be characterized with a Beta distribution, the evaluation system 114 defines the prior distribution as $$P(\pi) = \text{Beta}(\alpha, \beta) = \frac{\pi^{\alpha-1}(1-\pi)^{\beta-1}}{B(\alpha, \beta)},$$

where $$B(\alpha, \beta) = \frac{\Gamma(\alpha)\Gamma(\beta)}{\Gamma(\alpha+\beta)}.$$

Then, by substituting the components of the Bayesian expression, the evaluation system 114 obtains $$P(\pi \mid C, N) = \frac{\left[\binom{N}{C}\pi^C(1-\pi)^{N-C}\right]\left[\frac{\pi^{\alpha-1}(1-\pi)^{\beta-1}}{B(\alpha, \beta)}\right]}{\int_0^1 P(C, N \mid \pi)P(\pi)d\pi} \propto \pi^C(1-\pi)^{N-C}\pi^{\alpha-1}(1-\pi)^{\beta-1} =$$

$$\pi^{C+\alpha-1}(1-\pi)^{N-C+\beta-1}.$$

The evaluation system 114 transforms the expression of proportionality to an expression of equality by using a constant K to represent the proportionality factor to obtain $$P(\pi \mid C, N) = K\pi^{C+\alpha-1}(1-\pi)^{N-C+\beta-1}.$$

Since the posterior must integrate to 1, the evaluation system 114 modifies the posterior distribution to $$P(\pi \mid C, N) = \binom{N+\alpha+\beta-2}{C+\alpha} \times \pi^{C+\alpha-1}(1-\pi)^{N-C+\beta-1},$$

which corresponds to a Beta distribution with updated parameters, as given by

Beta($\alpha$+C,$\beta$+N−C).

Given the input of another user's rating, denoted, $C'/N' \in (0,1)$, the evaluation system 114 defines the revised posterior distribution as $$P(\pi \mid C, N, C', N') =$$

$$\binom{N+N'+\alpha+\beta-2}{C+C'+\alpha} \times \pi^{C+C'+\alpha-1}(1-\pi)^{N+N'-(C+C')+\beta-1},$$

which corresponds to a Beta distribution with updated parameters:

Beta($\alpha+C+C'$, $\beta+N+N'-C-C'$)

Now, given this technique of updating the prior belief distribution into a posterior belief distribution, the evaluation system 114 can generalize the model for a sequence of T updates in the following manner:

For time $t_0 < T$, let the prior distribution be

Beta($\alpha+C_{t_0}$, $\beta+N_{t_0}-C_{t_0}$).

Then, the posterior distribution is $$\text{Beta}\left(\alpha + \sum_{i=1}^{T} C_{t_i},\ \beta + \sum_{i=1}^{T} N_{t_i} - \sum_{i=1}^{T} C_{t_i}\right).$$

By implementing this technique over n user ratings on content item truthfulness, the evaluation system 114 can establish a posterior distribution during the prompt evaluation period. The evaluation system 114 reports this sequentially updated belief distribution to the community of users, so that they will have an understanding of the collective belief of the content item. The evaluation system 114 may apply the following intuition:

Belief distributions with higher expected values represent a collective belief that the content item is more truthful than content items with relatively lower belief distribution expected values.

Belief distributions with lower expected values represent a collective belief that the content item is less truthful than content items with relatively higher belief distribution expected values.

Secondary Time Period

In the secondary period (nominally days to weeks after an article has initially been published, representing retrospective evaluations of articles), a subset of the user population that did not originally evaluate the content item may be asked to provide their evaluations on the content item. Their ratings may represent a belief state on the content item treated as a proxy for an accurate belief state on the truthfulness of the content item. Given this belief state, individuals whose prompt belief ratings closely match the collective's retrospective belief state are identified as "expert evaluators," and as a result the evaluation system 114 may weight their evaluations more heavily on subsequent prompt evaluations. The evaluation system 114 may employ several techniques of assessing whether a prompt evaluation constitutes a match with a posterior evaluation. The simplest technique is by expected value matching:

Match criteria: User $n$ truth rating$_{prompt}$=$EV$[belief distribution$_{retrospective}$].

If a user's truthfulness rating during the prompt evaluation period matches the expected value of the retrospective belief distribution, then this is considered a match. Alternately, the evaluation system 114 can apply a gradient function that results in a "degree of match" (DOM) as a function of the difference between the user's prompt rating and the expected value of the retrospective belief distribution, according to $$DOM_n = \frac{1}{\text{User } n \text{ truth rating}_{prompt} - EV[\text{retrospective belief distribution}]}.$$

The degree of match carries a conditional value according to $$DOM_n = \begin{cases} \dfrac{1}{\text{User } n \text{ truth rating}_{prompt} - EV[\text{belief distribution}_{retrospective}]}, \\ 0, \end{cases}$$

match criteria satisfied otherwise

The evaluation system 114 may use the $DOM_n$ values in subsequent prompt evaluations by weighting the ratings from high $DOM_n$ value users more heavily than users with low $DOM_n$ values.

By employing an ongoing, continuous flow of prompt and retrospective truthfulness evaluations of many content items over time, the evaluation system 114 may (1) establish a belief on the truthfulness of content items based upon crowd-sourced evaluations, and (2) identify expert evaluators from among the crowd to further improve the efficacy of fake news detection.

Figure 17:
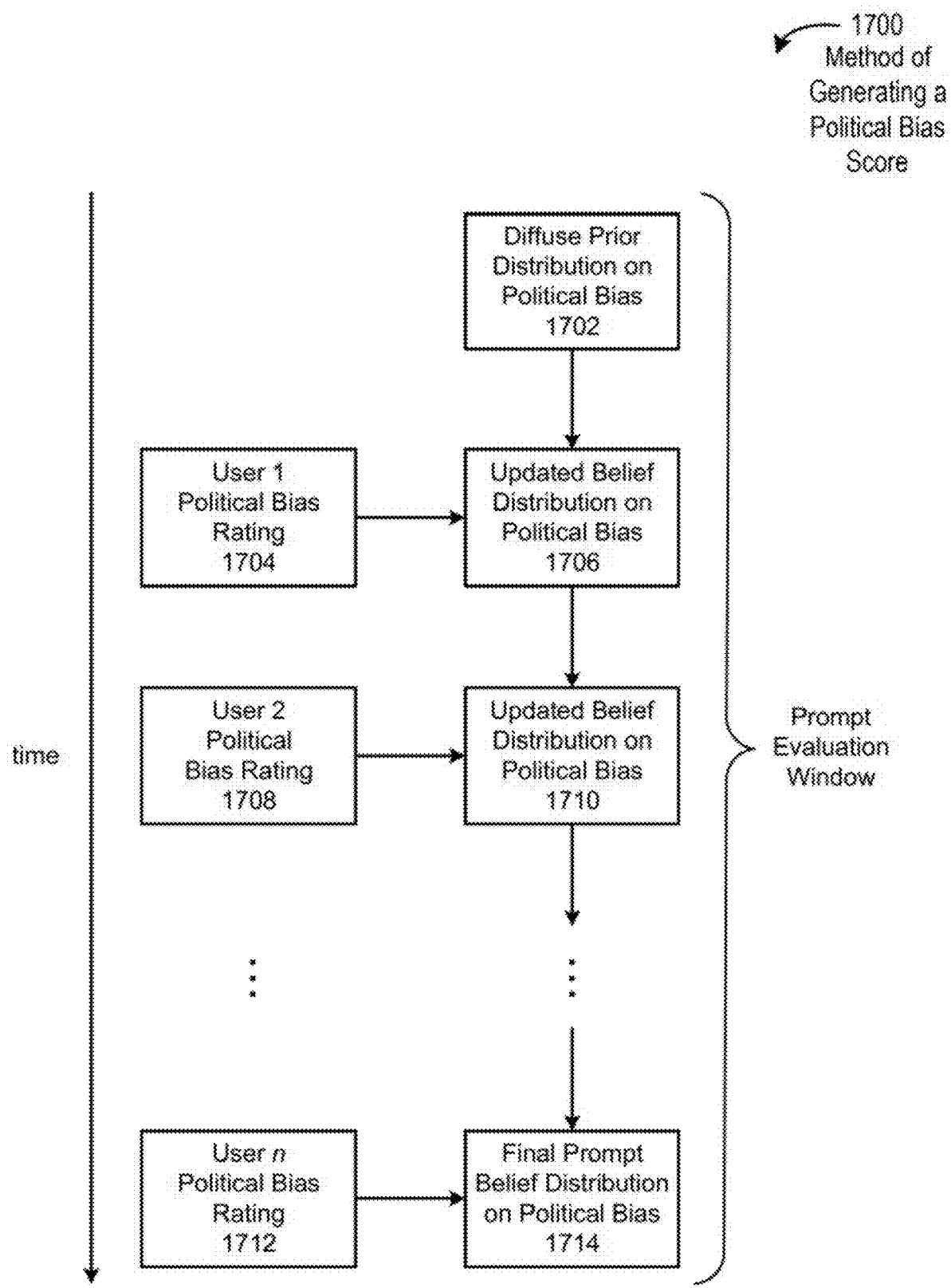
FIG. 17 depicts a flowchart of an example method of using Bayesian statistics to generate a political bias score, according to some embodiments.

FIG. 17 depicts a flowchart of an example method 1700 of using Bayesian statistics to generate a prompt political bias score, according to some embodiments. As described above, the collective set of evaluations represents the user population's prior belief state of the content item. Various embodiments use Bayesian updating methods to modify the belief state over two time windows: a primary period and a secondary period. In the primary period (nominally hours-to-days, representing prompt evaluations of a newly published content item), as ratings are submitted, the evaluation system 114 uses Bayesian updating to update the collective belief state regarding the political bias of the content item. The method 1700 begins in step 1702 with the evaluation system 114 diffusing a prior distribution on political bias. The evaluation system 114 in step 1704 receives a political bias rating from a first user and in step 1706 uses Bayesian updating to update the distribution on political bias. The evaluation system 114 in step 1708 receives a political bias rating from a second user and in step 1710 uses Bayesian updating to update again the distribution on political bias. The evaluation system 114 repeats this n times. As shown, the evaluation system 114 in step 1712 receives a political bias rating from an nth user and in step 1714 uses Bayesian updating to update again the distribution on political bias.

Figure 18A:
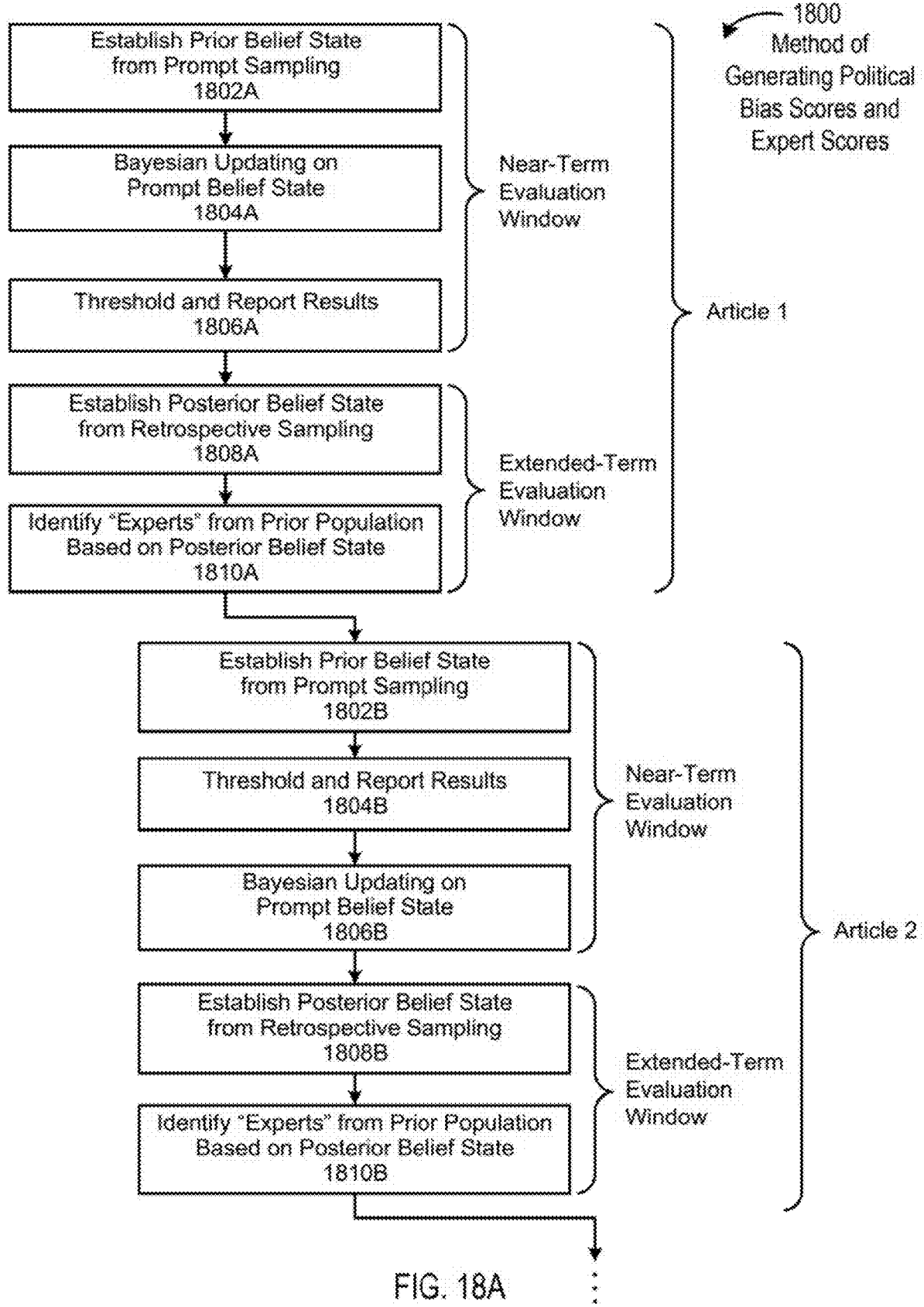
FIGS. 18A and 18B depict a flowchart of an example method of using Bayesian statistics to generate political bias scores and expert scores, according to some embodiments.
Figure 18B:
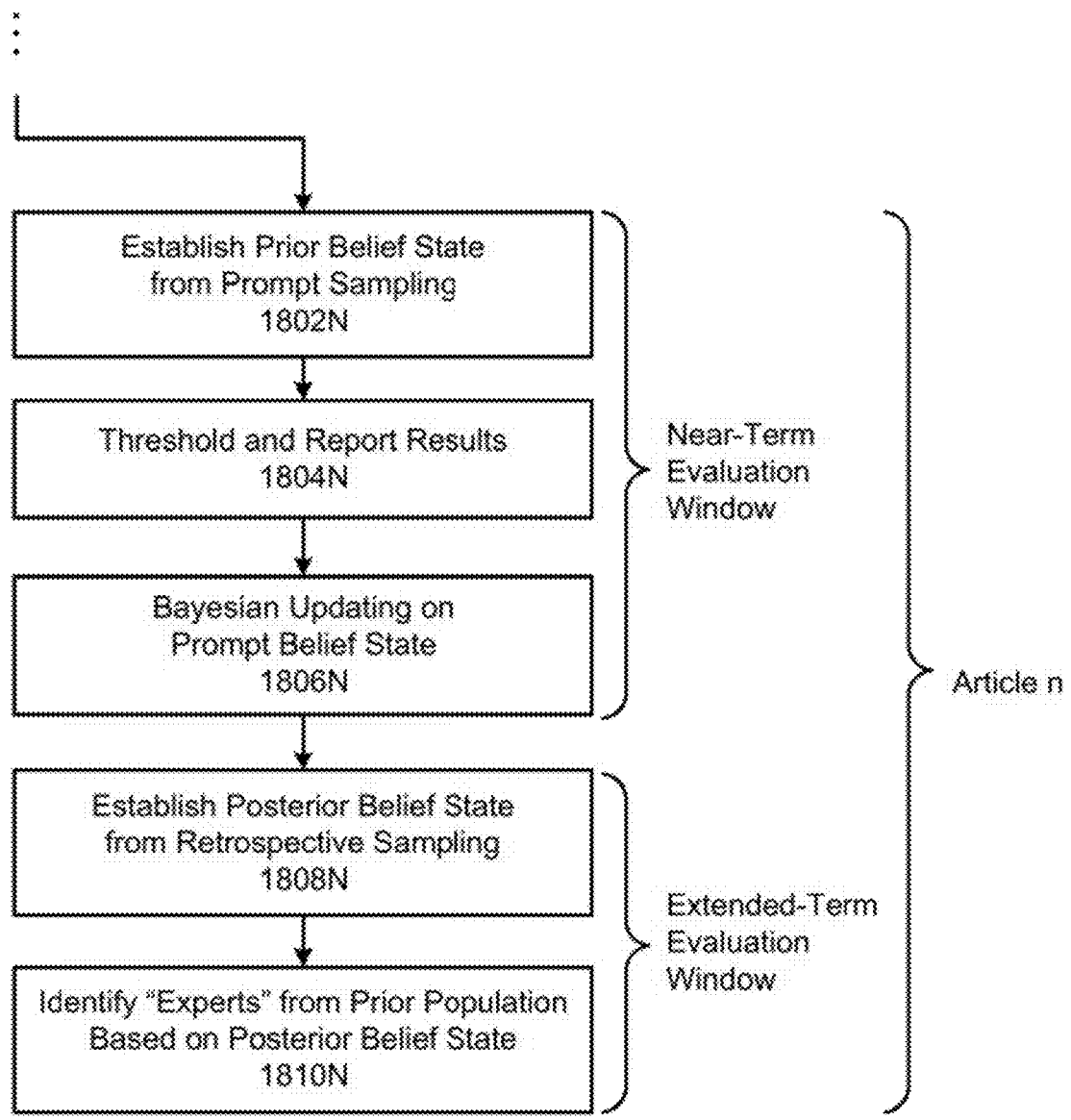

FIGS. 18A and 18B depict a flowchart of an example method 1800 of using Bayesian statistics to generate political bias scores and expert scores, according to some embodiments. Various embodiments use Bayesian updating techniques to modify the belief state (e.g., political bias) over two time windows: a primary period and a secondary period. The evaluation system 114 may compare the political bias ratings submitted in the primary period (nominally hours-to-days, representing prompt evaluations of a newly published content item), against political bias ratings provided in the secondary period to evaluate expertise.

As shown, the method 1800 includes a political bias evaluation process that repeats for N content items (e.g., articles). The method 1800 begins a primary period for a first content item (e.g., article 1) in step 1802A, during which the evaluation system 114 receives a prompt sampling of user ratings to establish a prior belief state (e.g., a political bias state) from the prompt sampling. The method 1800 continues in step 1804A during which the evaluation system 114 uses Bayesian updating techniques to update the prompt belief state with additional user ratings received during the primary period. The method 1800 continues until the conclusion of the primary period in step 1806A by the evaluation system 114 generating a belief-state score (e.g., a political bias score). The method 1800 begins a secondary period in step 1808A, during which the evaluation system 114 receives a set of retrospective ratings from users as to the belief state and generates a retrospective belief-state score from the retrospective sampling. The method 1800 continues at the conclusion of the secondary period in step 1810A by the evaluation system 114 uses the retrospective belief-state score to evaluate users to identify experts from the users who rated the belief state of the content item during the initial period and primary period. The method 1800 continues in steps 1802B, 1804B, 1806B, 1808B and 1810B for a second content item (e.g., article 2). The method 1800 repeats for N content items, the evaluation of the Nth content item (e.g., article N) being shown in steps 1802N, 1804N, 1806N, 1808N and 1810N. Further details of method 1800 are provided below.

Primary Time Period

Starting with a diffuse prior (either a variant of a Normal distribution or beta(1,1)) as users provide evaluations on the political bias of a content item, the belief state distribution is updated in a sequential fashion in the following manner:

Suppose user n believes that the political bias of a content item is rated as a value $C/N \in (0,1)$. For example:

$$\begin{pmatrix} \frac{C}{N} > 0.5 \\ \frac{C}{N} = 0.5 \\ \frac{C}{N} < 0.5 \end{pmatrix} = \begin{pmatrix} \text{conservative} \\ \text{neutral} \\ \text{liberal} \end{pmatrix}.$$

Then, the evaluation system 114 uses Bayesian updating to formulate the posterior distribution on the political bias of the content item, given a diffuse prior, as given by $$P(\pi \mid C, N) = \frac{P(C, N \mid \pi) P(\pi)}{P(C, N)},$$

where $\pi$ is the political bias parameter. The likelihood function, or the probability of observing the political bias rating $C/N$ given $\pi$ is defined as $$P(C, N \mid \pi) = \binom{N}{C} \pi^C (1-\pi)^{N-C},$$

since the evaluation system 114 treats the C/N rating as a proxy for the total proportion of times that C unbiased content items will be observed among N total articles. Therefore, the evaluation system 114 treats the likelihood function as a binomial distribution function. The marginal likelihood, or evidence, is given by $$P(C, N) = \int_0^1 P(C, N \mid \pi) P(\pi) d\pi.$$

Assuming the prior distribution can be characterized with a Beta distribution, the evaluation system 114 defines the prior distribution as $$P(\pi) = \text{Beta}(\alpha, \beta) = \frac{\pi^{\alpha-1}(1-\pi)^{\beta-1}}{B(\alpha, \beta)},$$

where $$B(\alpha, \beta) = \frac{\Gamma(\alpha)\Gamma(\beta)}{\Gamma(\alpha+\beta)}.$$

Then, by substituting the components of the Bayesian expression, the evaluation system 114 obtains $$P(\pi \mid C, N) = \frac{\left[\binom{N}{C}\pi^C(1-\pi)^{N-C}\right]\left[\frac{\pi^{\alpha-1}(1-\pi)^{\beta-1}}{B(\alpha,\beta)}\right]}{\int_0^1 P(C, N \mid \pi) P(\pi) d\pi} \propto \pi^C(1-\pi)^{N-C}\pi^{\alpha-1}(1-\pi)^{\beta-1} =$$

$$\pi^{C+\alpha-1}(1-\pi)^{N-C+\beta-1}.$$

The evaluation system 114 transforms this expression of proportionality to an expression of equality by using a constant K to represent the proportionality factor to obtain $$P(\pi \mid C, N) = K\pi^{C+\alpha-1}(1-\pi)^{N-C+\beta-1}.$$

Since the posterior must integrate to 1, the evaluation system 114 modifies the posterior distribution to $$P(\pi \mid C, N) = \binom{N+\alpha+\beta-2}{C+\alpha} \times \pi^{C+\alpha-1}(1-\pi)^{N-C+\beta-1},$$

which corresponds to a Beta distribution with updated parameters, as given by

Beta($\alpha$+C,$\beta$+N−C).

Given the input of another user's rating, denoted C'/N' $\in$ (0,1), the evaluation system 114 defines the revised posterior distribution as $$P(\pi \mid C, N, C', N') = \binom{N+N'+\alpha+\beta-2}{C+C'+\alpha} \times \pi^{C+C'+\alpha-1}(1-\pi)^{N+N'-(C+C')+\beta-1},$$

which corresponds to a Beta distribution with updated parameters:

Beta($\alpha$+C+C',$\beta$+N+N'−C−C').

Now, given this technique of updating the prior belief distribution into a posterior belief distribution, the evaluation system 114 generalizes the model for a sequence of T updates in the following manner:

For time $t_0 < T$, let the prior distribution be

Beta($\alpha + C_{t_0}, \beta + N_{t_0} - C_{t_0}$).

Then the posterior distribution is $$\text{Beta}\left(\alpha + \sum_{i=1}^{T} C_{t_i}, \beta + \sum_{i=1}^{T} N_{t_i} - \sum_{i=1}^{T} C_{t_i}\right).$$

By implementing this technique over n user ratings on content item political bias, the evaluation system 114 establishes a posterior distribution during the prompt evaluation period. The evaluation system 114 reports this sequentially updated belief distribution to the community of users, so that they will have an understanding of the collective belief of the content item. The evaluation system 114 applies the following intuition:

Belief distributions with higher expected values represent a collective belief that the content item is more conservative-leaning than content items with relatively lower belief distribution expected values.

Belief distributions with lower expected values represent a collective belief that the content item is more liberal-leaning than content items with relatively higher belief distribution expected values.

Secondary Time Period

In the secondary period (nominally days to weeks after an article has initially been published, representing retrospective evaluations of articles), a subset of the user population that did not originally evaluate the content item is asked to provide their evaluations on the content item. Their ratings may represent a belief state on the content item treated as a proxy for an accurate belief state on the political bias of the content item. Given this belief state, individuals whose prompt beliefs closely match the collective's retrospective belief state are identified as "expert evaluators," and as a result the evaluation system 114 may weight their evaluations more heavily on subsequent prompt evaluations. The evaluation system 114 may employ several techniques of assessing whether a prompt evaluation constitutes a match with a posterior evaluation. The simplest technique is by expected value matching:

Match criteria: User $n$ political bias rating$_{prompt}$=EV [retrospective belief distribution]

If a user's political bias rating during the prompt evaluation period matches the expected value of the retrospective belief distribution, then this may be considered a match. Alternately, the evaluation system 114 can apply a gradient function that results in a "degree of match" (DOM) as a function of the difference between the user's prompt rating and the expected value of the retrospective belief distribution, according to $$DOM_n = \frac{1}{\text{User } n \text{ political bias rating}_{prompt} - EV[\text{belief distribution}_{retrospective}]}$$

The degree of match carries a conditional value according to $$DOM_n = \begin{cases} \frac{1}{\text{User } n \text{ political bias rating}_{prompt} - EV[\text{belief distribution}_{retrospective}]}, \\ 0, \end{cases}$$

match criteria satisfied otherwise

The evaluation system 114 may use the $DOM_n$ values in subsequent prompt evaluations by weighting the ratings from high DOM value users more heavily than users with low $DOM_n$ values.

By employing an ongoing, continuous flow of prompt and retrospective political bias evaluations of many content items over time, the evaluation system 114 may (1) establish a belief on the political bias of content items based upon crowd-sourced evaluations, and (2) identify expert evaluators from among the crowd to further improve the efficacy of a political bias detector.

Figure 19:
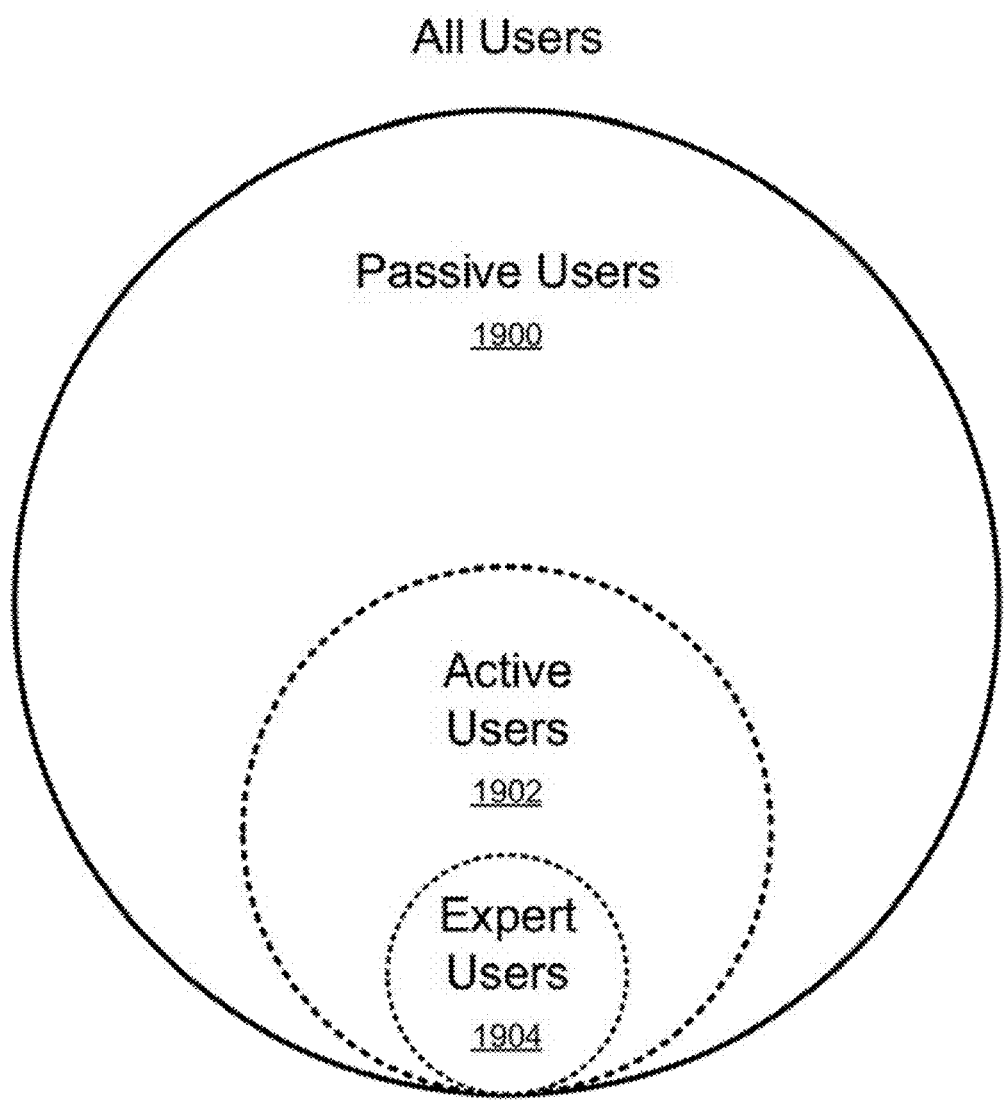
FIG. 19 depicts the types of users, according to some embodiments.

FIG. 19 depicts the types of users, according to some embodiments. The types of users include passive users 1900, a subsection of which are active users 1902, a subsection of which become expert users 1904.

Passive Users are an integral part of the community and may constitute the bulk of the user base. A passive user may be someone who consumes content items but does not actively provide content ratings. In some embodiments, although passive users are welcome to rate content items, they are not required to do so. In some embodiments, a social media account on the social media system 116 is not needed to provide ratings. In some embodiments, for a user to receive credit for providing content ratings, a social media account on the social media system 116 must be established. The passive user receives the benefit of receiving immediate and clear feedback concerning the veracity and/or political bias and/or other belief state of a content item. In some embodiments, even without an account, a passive user may obtain personalization of the experience based on prior activity on the social media website. For example, the social media system 116 may provide recommendations of content items based on prior reading interests.

Active users may be defined as those people who have established an account on the social media system 116 or users who have at any time provided a content rating, who recently provided a content rating, who regularly provide content ratings, and/or the like. In some embodiments, active users may be people who contribute content items to the social media website. The social media system 116 may provide opportunity for active users to connect with other active users with similar interests and/or expertise, to share information about themselves and their backgrounds, and/or to provide comments on the articles in addition to the numerical ratings. In some embodiments, the social media system 116 may enable active users to comment on content items that are at issue and suggest corrections to make the articles more accurate. In some embodiments, the social media system 116 may enable the active user to add a narrative to a comment section associated with a content item, e.g., to cite specific evidence of an content item's inaccuracy including links to other possibly related content items.

Experts are active users who have proven their expertise as prompt evaluators of content items, possibly divided by topic area or possibly generally across all areas. In some embodiments, experts are categorized based on area of expertise and a record of the expert scores may be maintained of the experts based on the accuracy of their rating record. In some embodiments, each of the expert scores will be time adjusted to ensure that more recent ratings account for a larger component of the scores. This will ensure continuous quality control of the experts, encourage new experts to join the community, and simultaneously encourage existing experts to remain engaged. Experts will be able to, if desired, leverage their expert status in other areas of their lives, potentially for professional gain. For example, a person identified as a political expert may parlay the recognition of that expertise into their own opportunities providing commentary. The same can be said for someone who is identified as an expert sports prognosticator. In order to provide effective incentives for experts to contribute to this community, some embodiments of the social media system 116 may share revenue across the expert community based on a set of rules. In some embodiments, the experts that rate most often and most accurately will receive the greatest compensation. The compensation need not be linear so the most expert can earn significantly more than marginal experts.

It will be appreciated that an "engine," "system," "datastore," and/or "database" may comprise software, hardware, firmware, and/or circuitry. In one example, one or more software programs comprising instructions capable of being executable by a processor may perform one or more of the functions of the engines, datastores, databases, or systems described herein. In another example, circuitry may perform the same or similar functions. Alternative embodiments may comprise more, less, or functionally equivalent engines, systems, datastores, or databases, and still be within the scope of present embodiments. For example, the functionality of the various systems, engines, datastores, and/or databases may be combined or divided differently. The datastore or database may include cloud storage. It will further be appreciated that the term "or," as used herein, may be construed in either an inclusive or exclusive sense. Moreover, plural instances may be provided for resources, operations, or structures described herein as a single instance.

The datastores described herein may be any suitable structure (e.g., an active database, a relational database, a self-referential database, a table, a matrix, an array, a flat file, a documented-oriented storage system, a non-relational No-SQL system, and the like), and may be cloud-based or otherwise.

The systems, methods, engines, datastores, and/or databases described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The embodiments herein are described above with reference to examples. It will be apparent to those skilled in the art that various modifications may be made and other embodiments may be used without departing from the broader scope of the teachings herein. Therefore, these and other variations upon the example embodiments are intended to be covered.

The invention claimed is:

1. A system comprising:
   at least one hardware processor; and
   memory storing computer instructions configured to assist in having content items that are presented by a web browser or an application evaluated, the computer instructions when executed by the at least one hardware processor being configured to cause the system to
   identify a particular content item made available on a publication date for presentation to users by the web browser or the application, the particular content item having particular subject matter content, the particular subject matter content containing stated facts or opinions which a user is unsure whether to trust;
   during a first time period, obtain first content evaluations of the particular content item from first users, each first content evaluation defining a first user evaluation of a belief state of the stated facts or opinions of the particular subject matter content in the particular content item;
   assist in displaying the first content evaluations in association with the particular content item;
   during a second time period, the first time period initiating nearer to the publication date than the second time period, obtain second evaluations from second users regardless of second user expertise, the second users during the second time period defined as having benefit of hindsight as to the stated facts or opinions greater than most of the first users and thus being presumed to have knowledge as to the belief state of the stated facts or opinions of the particular subject matter content in the particular content item greater than most of the first users;
   generate an expert score for each of the first users who provided the first content evaluations of the particular content item, the expert score for each of the first users being based on the second evaluations from the second users;
   issue the expert score to each of the first users; and
   elevate an influential characteristic of each of the first users having an expert score higher than a certain threshold when providing another evaluation during another time period.

2. The system of claim 1, wherein the belief state is truthfulness of the subject matter content in the particular content item.

3. The system of claim 1, wherein the belief state is political bias of the subject matter content in the particular content item.

4. The system of claim 1, wherein each first content evaluation includes a discrete value between a low value and a high value.

5. The system of claim 4, wherein each first content evaluation further includes a confidence value associated with the discrete value.

6. The system of claim 1, wherein the computer instructions are further configured to cause the system to:
capture first user behavior information of each first user of the first users; and
evaluate based on the first user behavior information whether to accept each first content evaluation of the first content evaluations from each first user of the first users.

7. The system of claim 1, wherein the computer instructions are further configured to cause the system to generate an author score of an author of the particular content item based on at least a portion of the first content evaluations.

8. The system of claim 7, wherein the computer instructions are further configured to cause the system to generate the author score of the author of the particular content item based further on the expert scores of the first users of the at least a portion of the first content evaluations.

9. The system of claim 1, wherein the computer instructions are further configured to cause the system to generate a publisher score of a publisher of the particular content item based on at least a portion of the first content evaluations.

10. The system of claim 9, wherein the computer instructions are further configured to cause the system to generate the publisher score of the publisher of the particular content item based further on the expert scores of the first users of the at least a portion of the first content evaluations.

11. The system of claim 1, wherein the expert score corresponds to a particular topic of content items.

12. The system of claim 1, wherein the expert score is a general expert score across all topics of content items.

13. The system of claim 1, wherein the computer instructions are further configured to cause the system to discard the expert score when it is deemed stale.

14. A method by a processor executing computer instructions configured to assist in having content items that are presented by a web browser or an application evaluated, the method comprising:
identifying a particular content item made available on a publication date for presentation to users by the web browser or the application, the particular content item having particular subject matter content, the particular subject matter content containing stated facts or opinions which a user is unsure whether to trust;
during a first time period, obtaining first content evaluations of the particular content item from first users, each first content evaluation defining a first user evaluation of a belief state of the stated facts or opinions of the particular subject matter content in the particular content item;
assisting in displaying the first content evaluations in association with the particular content item;
during a second time period, the first time period initiating nearer to the publication date than the second time period, obtaining second evaluations from second users regardless of second user expertise, the second users during the second time period defined as having benefit of hindsight as to the stated facts or opinions greater than most of the first users and thus being presumed to have knowledge as to the belief state of the stated facts or opinions of the particular subject matter content in the particular content item greater than most of the first users;
generating an expert score for each of the first users who provided the first content evaluations of the particular content item, the expert score for each of the first users being based on the second evaluations from the second users;
issuing the expert score to each of the first users; and
elevating an influential characteristic of each of the first users having an expert score higher than a certain threshold when providing another evaluation during another time period.

15. The method of claim 14, wherein the belief state is truthfulness of the subject matter content in the particular content item.

16. The method of claim 14, wherein the belief state is political bias of the subject matter content in the particular content item.

17. The method of claim 14, wherein each first content evaluation includes a discrete value between a low value and a high value.

18. The method of claim 17, wherein each first content evaluation further includes a confidence value associated with the discrete value.

19. The method of claim 14, further comprising:
capturing first user behavior information of each first user of the first users; and
evaluating based on the first user behavior information whether to accept each first content evaluation of the first content evaluations from each first user of the first users.

20. The method of claim 14, further comprising generating an author score of an author of the particular content item based on at least a portion of the first content evaluations.

21. The method of claim 20, further comprising generating the author score of the author of the particular content item based further on the expert scores of the first users of the at least a portion of the first content evaluations.

22. The method of claim 14, further comprising generating a publisher score of a publisher of the particular content item based on at least a portion of the first content evaluations.

23. The method of claim 22, further comprising generating the publisher score of the publisher of the particular content item based further on the expert scores of the first users of the at least a portion of the first content evaluations.

24. The method of claim 14, wherein the expert score corresponds to a particular topic of content items.

25. The method of claim 14, wherein the expert score is a general expert score across all topics of content items.

26. The method of claim 14, further comprising discarding the expert score when it is deemed stale.

* * * * *